US012656832B2

(12) United States Patent
Jeong

(10) Patent No.: US 12,656,832 B2
(45) Date of Patent: Jun. 16, 2026

(54) WINDOW ASSEMBLY COMPRISING A PROTECTIVE FILM HAVING A MASKING MEMBER AND METHOD FOR MANUFACTURING DISPLAY DEVICE

(71) Applicant: Samsung Display Co., LTD., Yongin-si (KR)

(72) Inventor: Sanghyuk Jeong, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 384 days.

(21) Appl. No.: 18/234,972

(22) Filed: Aug. 17, 2023

(65) Prior Publication Data

US 2024/0160247 A1 May 16, 2024

(30) Foreign Application Priority Data

Nov. 10, 2022 (KR) ........................ 10-2022-0149863

(51) Int. Cl.
*G06F 1/16* (2006.01)
*H04M 1/02* (2006.01)
(52) U.S. Cl.
CPC ........ *G06F 1/1656* (2013.01); *H04M 1/0266* (2013.01)
(58) Field of Classification Search
CPC ...................... B60R 1/08; B60R 1/062; B60R 2001/1223; B60R 2011/0042; G01S 2013/9327
See application file for complete search history.

(56) References Cited

U.S. PATENT DOCUMENTS

| | | | |
|---|---|---|---|
| 10,525,672 B2 | 1/2020 | Lee et al. | |
| 11,522,159 B2 | 12/2022 | Park et al. | |
| 2017/0184911 A1* | 6/2017 | Ochi ................. | G02F 1/133308 |
| 2022/0332910 A1 | 10/2022 | Taki et al. | |

FOREIGN PATENT DOCUMENTS

| | | | | |
|---|---|---|---|---|
| JP | 2007280620 A | * 10/2007 | ....... | G02F 1/133615 |
| JP | 2008103700 A | * 5/2008 | ............. | H01L 24/83 |
| KR | 2020160004278 U | 12/2016 | | |
| KR | 20190030241 A | 3/2019 | | |
| KR | 20200034862 A | 4/2020 | | |
| KR | 102403879 B1 | 5/2022 | | |
| KR | 20220094204 A | 7/2022 | | |

* cited by examiner

*Primary Examiner* — Paul C Lee
(74) *Attorney, Agent, or Firm* — CANTOR COLBURN LLP

(57) ABSTRACT

A window assembly includes a cover member including a front surface and a rear surface opposite to the front surface, and a protective film assembly disposed on the front surface or the rear surface of the cover member, where the protective film assembly includes a base part including a first portion overlapping the cover member, and a second portion protruding from the first portion, an adhesive layer disposed on the base part and between the cover member and the base part, and a masking member disposed on the adhesive layer to overlap at least a portion of the second portion, where the masking member includes a material derived from a curable ink composition.

19 Claims, 16 Drawing Sheets

WINDOW ASSEMBLY COMPRISING A PROTECTIVE FILM HAVING A MASKING MEMBER AND METHOD FOR MANUFACTURING DISPLAY DEVICE

This application claims priority to Korean Patent Application No. 10-2022-0149863, filed on Nov. 10, 2022, and all the benefits accruing therefrom under 35 U.S.C. § 119, the content of which in its entirety is herein incorporated by reference.

BACKGROUND

1. Field

The disclosure herein relates to a window assembly and a method for manufacturing a display device, and more particularly, to a window assembly with improved reliability and a method for manufacturing a display device.

2. Description of the Related Art

A display device is a device for displaying images and includes a display panel such as an organic light emitting display panel or a liquid crystal display panel. The display device may include a window for protecting the display panel from external impacts. Particularly, the window is widely applied in a portable electronic device such as a smart phone.

In a manufacturing process of a display device, a protective film may be adhered to both sides of a window thereof to protect the window during a process of being transferred and loaded, or the like.

SUMMARY

In a manufacturing process of a display device, when attaching a window to a display panel, a protective film adhered to the window to protect the window may be peeled off and removed. The protective film may include an adhesive layer, and when the adhesive layer contacts a specific portion of a surface of the window, the protective film may act as a foreign material.

The disclosure provides a window assembly which may be prevented from being contaminated and damaged during processing and transferring.

The disclosure also provides a method for manufacturing a display device, the method capable of preventing contamination and damage in processing and transferring, and reducing the number of processes.

An embodiment of the invention provides a window assembly including a cover member including a front surface and a rear surface opposite to the front surface, and a protective film assembly disposed on at least one of the front surface or the rear surface of the cover member, where the protective film assembly includes a base part including a first portion overlapping the cover member, and a second portion protruding from the first portion, an adhesive layer disposed on the base part and between the cover member and the base part, and a masking member disposed on the adhesive layer to overlap at least a portion of the second portion, where the masking member includes a material derived from a curable ink composition.

In an embodiment, the curable ink composition may include an acrylic resin.

In an embodiment, the curable ink composition may further include a photoinitiator.

In an embodiment, the masking member may have a thickness in a range of about 3 micrometers to about 20 micrometers.

In an embodiment, the masking member may be spaced apart from the cover member by a first gap, where the first gap may be about 0.2 millimeter (mm) or less.

In an embodiment, the adhesive layer may include a first adhesive surface adjacent to the cover member, and a second adhesive surface adjacent to the base part, wherein the masking member may be disposed on the first adhesive surface.

In an embodiment, the adhesive layer may be in contact with each of the base part and the cover member.

In an embodiment, the adhesive layer may be defined by a single layer between the masking member and the base part.

In an embodiment, the adhesive layer may include a first adhesive portion overlapping the first portion of the base part, and a second adhesive portion overlapping the second portion of the base part, wherein the masking member may be disposed on the second adhesive portion.

In an embodiment, one side surface of the second portion, one side surface of the second adhesive portion, and one side surface of the masking member may define a single aligned side surface of the window assembly.

In an embodiment, the protective film assembly may include a first protective film assembly disposed on the rear surface of the cover member, and a second protective film assembly disposed on the front surface of the cover member.

In an embodiment, the first protective film assembly may include a first masking member, and the second protective film assembly may include a second masking member, wherein the first masking member and the second masking member do not overlap each other on a plane.

In an embodiment, the second portion may not overlap the cover member on a plane.

In an embodiment of the invention, a window assembly includes a cover member including a front surface and a rear surface opposite to the front surface, and a protective film assembly disposed on at least one selected from the front surface and the rear surface of the cover member, where the protective film assembly includes a base part including a first portion overlapping the cover member, and a second portion protruding from the first portion, an adhesive layer disposed on the base part, where at least a portion of the adhesive layer is disposed between the cover member and the base part, and a masking member disposed on the adhesive layer to overlap at least a portion of the second portion, and includes a cured acrylic resin.

In an embodiment of the invention, a method for manufacturing a display device includes preparing a cover member, preparing a display module, and coupling the cover member to the display module, where the preparing of the cover member includes forming a protective film assembly, and adhering the protective film assembly on at least one surface of the cover member, where the forming the protective film assembly includes preparing a base part including a first portion overlapping the cover member, and a second portion protruding from the first portion, forming an adhesive layer on the base part, forming a preliminary masking member on the adhesive layer by providing a curable ink composition to overlap the second portion, and forming a masking member by curing the preliminary masking member.

In an embodiment, the preparing the cover member may further include removing the protective film assembly adhered to the at least one surface of the cover member.

In an embodiment, the curable ink composition may include an acrylic resin.

In an embodiment, the curable ink composition may further include a photoinitiator, and in the curing of the preliminary masking member, the preliminary masking member may be irradiated with ultraviolet rays.

In an embodiment, in the curing of the preliminary masking member, the preliminary masking member may be moisture-cured.

In an embodiment, the curing the preliminary masking member may be performed at about 60° C. or less.

BRIEF DESCRIPTION OF THE DRAWINGS

The above and other features of the invention will become more apparent by describing in further detail embodiments thereof with reference to the accompanying drawings, in which.

DETAILED DESCRIPTION

Figure 1:
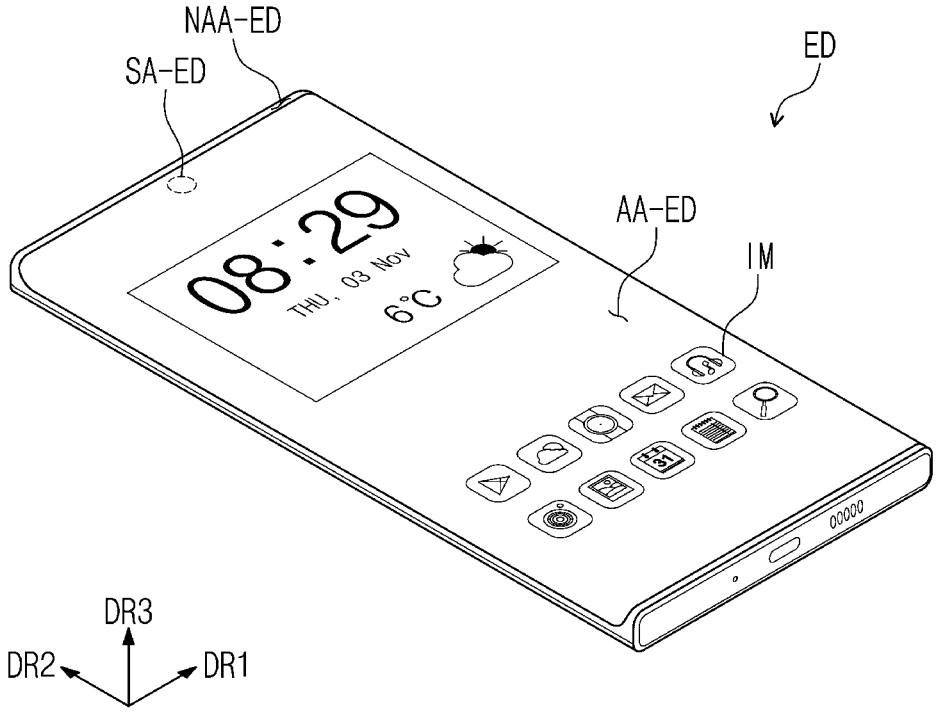
FIG. 1 is a perspective view of an electronic device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the disclosure, when an element (or an area, a layer, a portion, etc.) is referred to as being "on," "connected to," or "coupled to" another element, it means that the element may be directly connected to/coupled to the other element, or that a third element may be disposed therebetween.

Like reference numerals refer to like elements. Also, in the drawings, the thickness, the ratio, and the dimensions of elements are exaggerated for an effective description of technical contents.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of which associated listed items.

It will be understood that, although the terms "first," "second," etc. may be used herein to describe various elements, these elements should not be limited by these terms. These terms are only used to distinguish one element from another. For example, a first element may be referred to as a second element, and a second element may also be referred to as a first element in a similar manner without departing the scope of rights of the invention.

In addition, terms such as "below," "lower," "above," "upper," and the like are used to describe the relationship of components shown in the drawings. The terms are used as a relative concept and are described with reference to the direction indicated in the drawings.

It should be understood that the term "comprise," "include" or "have" is intended to specify the presence of stated features, integers, steps, operations, elements, components, or combinations thereof in the disclosure, but do not preclude the presence or addition of one or more other features, integers, steps, operations, elements, components, or combinations thereof.

In the disclosure, being "directly disposed" may mean that there is no layer, film, region, plate, or the like added between a portion of a layer, a film, a region, a plate, or the like and other portions. For example, being "directly disposed" may mean being disposed without additional members such as an adhesive member between two layers or two members.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It is also to be understood that terms such as terms defined in commonly used dictionaries should be interpreted as having meanings that is consistent with the meanings in the context of the related art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described with reference to the accompanying drawings.

Figure 2A:
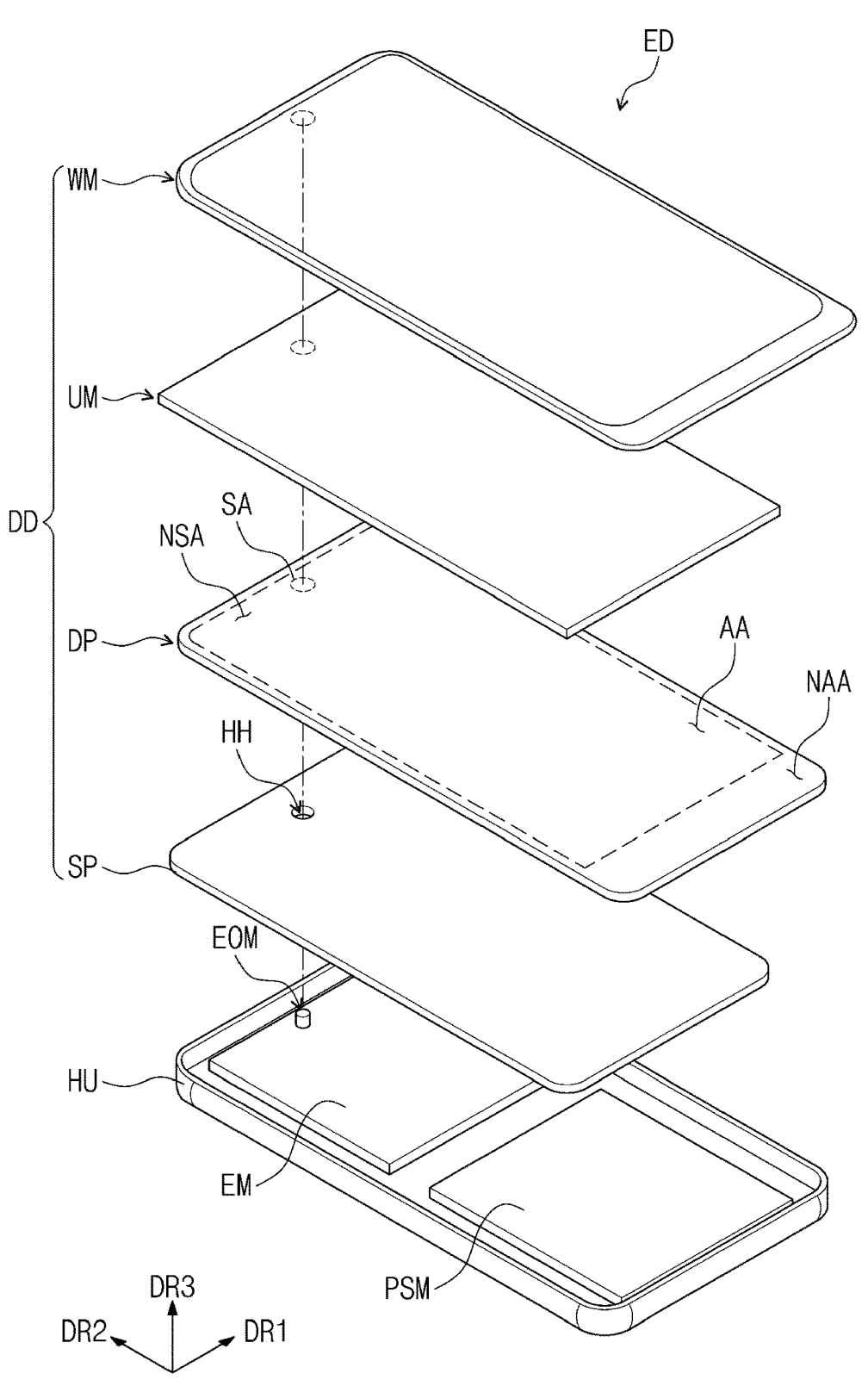
FIG. 2A is an exploded perspective view of an electronic device according to an embodiment of the invention.
Figure 2B:
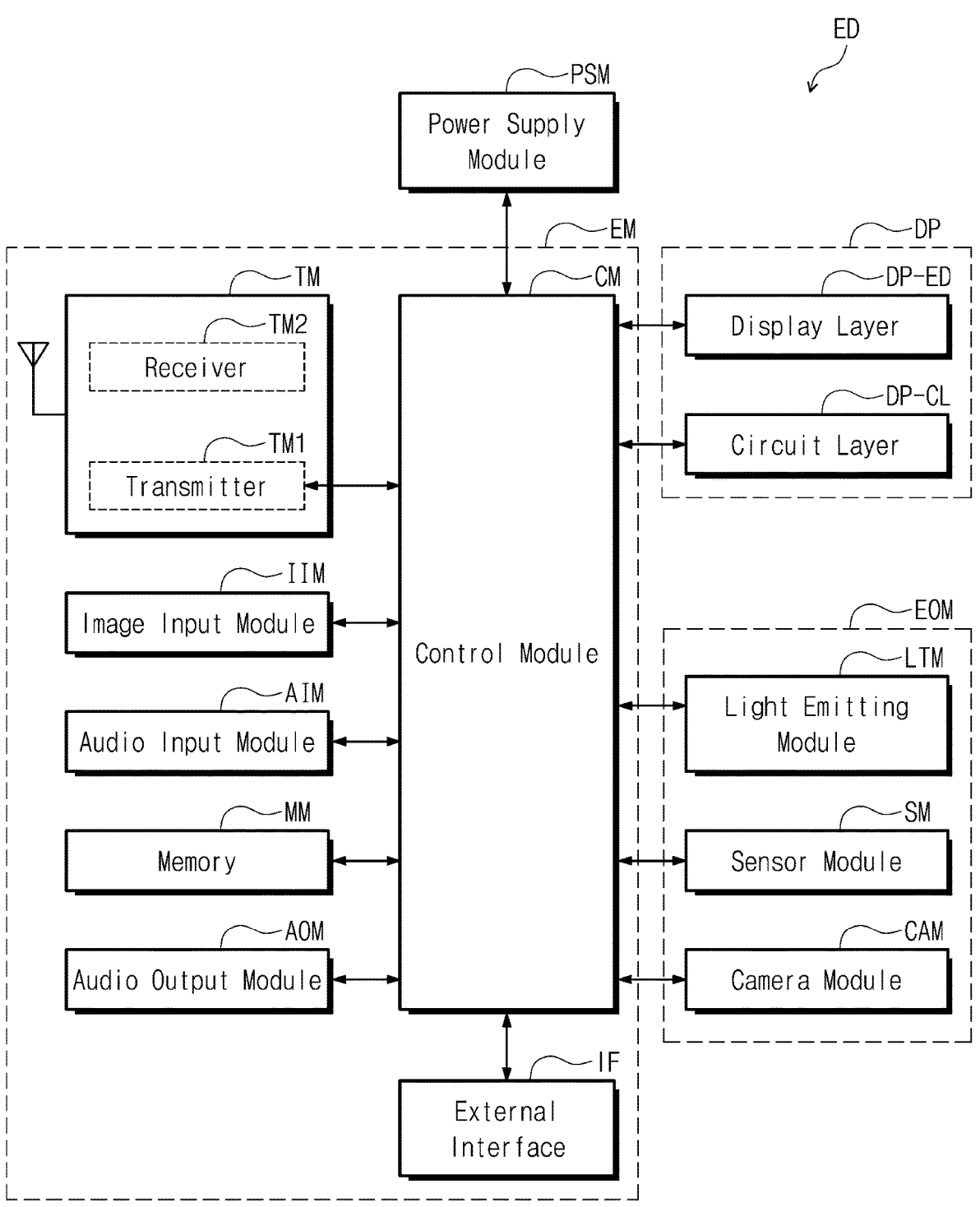
FIG. 2B is a block diagram of an electronic device according to an embodiment of the invention.

FIG. 1 is a perspective view of an electronic device ED according to an embodiment of the invention. FIG. 2A is an exploded perspective view of the electronic device ED according to an embodiment of the invention. FIG. 2B is a block diagram of the electronic device ED according to an embodiment of the invention.

The electronic device ED according to an embodiment may be a device activated according to an electrical signal. In an embodiment, for example, the electronic device ED may be a mobile phone, a tablet computer, a car navigation system unit, a game console, or a wearable device, but is not limited thereto. In FIG. 1, an embodiment where the electronic device ED is a mobile phone is illustrated as an example.

The electronic device ED may display an image IM through an active region AA-ED. The active region AA-ED may be on a plane defined by a first direction DR1 and a second direction DR2. The active region AA-ED may further include a curved surface bent from at least one side of the plane defined by the first direction DR1 and the second direction DR2. The electronic device ED according to an embodiment, as illustrated in FIG. 1, may include two curved surfaces respectively bent from opposing sides of the plane defined by the first direction DR1 and the second direction DR2. However, the shape of the active region AA-ED is not limited thereto. In an alternative embodiment, for example, the active region AA-ED may include only the plane, or the active region AA-ED may further include four curved surfaces bent from at least two, for example, four side surfaces of the plane, respectively.

In FIG. 1 and the following drawings, the first direction DR1 to a third direction DR3 are illustrated, and directions indicated by the first direction DR1, the second direction DR2, and the third direction DR3 described in the disclosure are a relative concept, and may be converted to different directions.

In the disclosure, the first direction DR1 and the second direction DR2 are perpendicular to each other, and the third direction DR3 may be a normal direction with respect to a plane defined by the first direction DR1 and the second direction DR2. In an embodiment of the disclosure, "on a plane" may mean when viewed on the plane defined by the first direction DR1 and the second direction DR2 or when viewed in the third direction DR3. Here, the third direction DR3, which is a normal direction with respect to the plane defined by the first direction DR1 and the second direction DR2, may be a thickness direction of the electronic device ED.

A sensing region SA-ED may be defined in the electronic device ED. FIG. 1 illustrates an embodiment where a sensing region SA-ED is defined as an example, but the number of the sensing region SA-ED is not limited thereto. In an alternative embodiment, a plurality of two or more sensing regions SA-ED may be defined. In an embodiment, the sensing region SA-ED may be defined in the active region AA-ED and be a portion of the active region AA-ED.

In an embodiment, as shown in FIG. 2A, an electronic optical module EOM may overlap the sensing region SA-ED. The electronic optical module EOM may receive an external input transmitted through the sensing region SA-ED, or may provide an output through the sensing region SA-ED. In an embodiment, for example, a camera module CAM or a sensor module SM of the electronic optical module EOM, which will be described later, may overlap the sensing region SA-ED.

The electronic device ED may include the active region AA-ED and a peripheral region NAA-ED adjacent to the active region AA-ED. The active region AA-ED may be a portion corresponding to a display region AA of a display panel DP to be described later, and the peripheral region NAA-ED may be a portion corresponding to a non-display region NAA of the display panel DP.

The peripheral region NAA-ED may be a region which blocks optical signals or visible light, and may be a region disposed outside the active region AA-ED to surround the active region AA-ED. In an embodiment, the peripheral region NAA-ED may be defined on a side surface, not a front surface, of the electronic device ED. The electronic device ED may include at least one bent side surface, and the peripheral region NAA-ED may be defined on the bent side surface.

The electronic device ED according to an embodiment includes a display device DD, a housing HU, and the electronic optical module EOM. The display device DD includes a window WM, an upper member UM, the display panel DP, and a lower member SP.

The display device DD according to an embodiment may include the window WM disposed on the display panel DP. The window WM provides an outer surface of the electronic device ED. The window WM may cover a front surface of the display panel DP, and may protect the display panel DP from external impacts and scratches. The window WM may be coupled to the upper member UM through an adhesive layer.

The window WM may include an optically transparent insulation material. In an embodiment, for example, the window WM may include a cover glass or a synthetic resin as a cover member. The window WM may have a single-layered structure or a multi-layered structure. In an embodiment, for example, the window WM may include a cover glass having a single-layered structure, may include a plurality of plastic films coupled by an adhesive, or may include a cover glass and a plastic film coupled by an adhesive. The window WM may further include a functional layer such as an anti-fingerprint layer, a phase control layer, or a hard coating layer, which are disposed on a transparent substrate.

In the display device DD according to an embodiment, the upper member UM may be disposed below the window WM and in an upper portion of a display module DM (see FIG. 3). The upper member UM may include an anti-reflection layer and an input sensing sensor. The anti-reflection layer may lower or reduce reflectance of external light. The input sensing sensor senses a user's external input. The upper member UM may further include an adhesive layer which couples the anti-reflection layer and the input sensing sensor.

In the display device DD according to an embodiment, the display panel DP may be disposed below the upper member UM. The lower member SP may be disposed below the display panel DP.

The display panel DP may include the display region AA in which the image IM is displayed and a non-display region NAA adjacent to the display region AA. That is, the front surface of the display panel DP may include the display region AA and the non-display region NAA. The display region AA may be a region activated according to an electrical signal to generate the image IM displayed in the active region AA-ED of the electronic device ED.

The non-display region NAA may be adjacent to the display region AA. The non-display region NAA may surround the display region AA. In the non-display region NAA, a driving circuit or a driving wiring for driving the display region AA, various signal lines or pads for providing electrical signals to the display region AA, an electronic element, or the like may be disposed.

The display panel DP may include a first region NSA and a second region SA. The second region SA may be a region overlapping the electronic optical module EOM, and the first region NSA may be a region disposed surrounding at least a portion of the second region SA. The second region SA may correspond to the sensing region SA-ED of the electronic device ED. The first region NSA may be a portion corresponding to the remaining region except for the second region SA in the display panel DP.

FIG. 2A illustrates an embodiment where the second region SA includes a single transmission region, but the embodiment of the invention is not limited thereto. Alternatively, two or more second regions SA may be defined in the display panel DP. In such an embodiment, for example, the second region SA may include a first signal transmission region and a second signal transmission region of the electronic device ED, where on a lower side of the display panel DP, the camera module CAM may be disposed to overlap the first signal transmission region, and the sensor module SM may be disposed to overlap the second signal transmission region. Although not illustrated, if desired, a predetermined opening may be defined in one region among the second regions SA of the display panel DP. That is, a portion of the display panel DP which corresponds to the one region among the second regions SA may be penetrated or removed. In an embodiment, as shown in FIG. 2A, the shape of the second region SA is a circular shape, but the shape of the second region SA is not limited thereto, and may be variously modified as desired.

On a plane or when viewed in the third direction DR3, the area of the second region SA may be less than the area of the first region NSA. The transmittance of the first region NSA and the transmittance of the second region SA may be different from each other. The transmittance of the second region SA may be greater than the transmittance of the first region NSA. Since the electronic optical module EOM is disposed overlapping the first region NSA, the performance of the electronic optical module EOM for outputting or receiving optical signals may be improved.

In the display panel DP according to an embodiment, some of the driving circuit or the driving wiring for driving a pixel PX (see FIG. 7) disposed in the second region SA, and the like may be disposed in the non-display region NAA, or in a portion of the first region NSA adjacent to the second region SA. In such an embodiment, the wiring density in the second region SA may be lower than the wiring density in the first region NSA. However, the embodiment of the invention is not limited thereto, and the wiring density in the second region SA and the wiring density in the first region NSA may be substantially the same as each other.

The display panel DP may include a display layer DP-ED (see FIG. 4) including an organic light emitting element, a quantum dot light emitting element, a micro-light emitting diode (LED) light emitting element, a nano-LED light emitting element, or the like. The display layer DP-ED (see FIG. 4) may be a component which substantially generates an image.

The lower member SP may be disposed below the display panel DP. The lower member SP may be a member which supports the display panel DP, absorbs an impact applied to the display panel DP, and performs a heat dissipation function of dissipating heat generated in an electronic module EM and a power supply module PSM.

A through-hole HH may be defined in the lower member SP to correspond to the first region NSA of the display panel DP. The through-hole HH may be formed to overlap the sensing region SA-ED of the electronic device ED. Although FIG. 2A illustrates an embodiment where the through-hole HH has a same shape and size as those of the first region NSA, the embodiment of the invention is not limited thereto, and the shape and size of the through-hole HH may be different from those of the first region NSA. In an embodiment, for example, the size of the through-hole HH may be greater than the size of the first region NSA The through-hole HH may have a shape that penetrates (or is defined to extend) from an upper surface of the lower member SP to a lower surface thereof. However, the embodiment of the invention is not limited thereto, and some of components included in the lower member SP may not be penetrated.

In the electronic device ED according to an embodiment, the electronic optical module EOM may be an electronic component which outputs or receives an optical signal. In an embodiment, for example, the electronic optical module EOM may include the camera module CAM and the sensor module SM. The camera module may capture an external image by receiving external light through the sensing region SA-ED. In addition, the sensor module SM may be a sensor such as a proximity sensor or an infrared light emitting sensor which outputs or receives external light through the sensing region SA-ED.

The electronic module EM may include a control module, a wireless communication module, an image input module, an audio input module, an audio output module, a memory, an external interface module, or the like. The electronic module EM may include the main circuit board, and the above modules may be mounted on the main circuit board, or may be electrically connected to the main circuit board through a flexible circuit board. The electronic module EM may be electrically connected to the power supply module PSM.

The power supply module PSM may supply power for the overall operation of the electronic device ED. In an embodiment, for example, the power supply module PSM may include a typical battery device.

In an embodiment, although not illustrated, the electronic device ED may include a flexible circuit board electrically connected to the display panel DP and a main circuit board connected to the flexible circuit board. The flexible circuit board may be disposed on a peripheral region NDA of the display panel DP to be coupled to the display panel DP. The flexible circuit board may be connected to the main circuit board. The main circuit board may be one electronic component constituting the electronic module EM. In the peripheral region NDA of the display panel DP, a region adjacent to the flexible circuit board may be provided as a bending region. The bending region may be bent around a bending axis parallel to the first direction DR1. Due to bending of the bending region, the flexible circuit board may overlap a portion of the display panel DP on a plane.

The electronic device ED according to an embodiment may include the display device DD, the electronic optical module EOM, the electronic module EM, and the housing HU disposed below the power supply module PSM. In the housing HU, the electronic optical module EOM, the power supply module PSM, the electronic module EM, and the display panel DP may be accommodated. In the electronic device ED according to an embodiment, the window WM and the housing HU may be coupled to each other to constitute the appearance of the electronic device ED.

Referring to FIG. 2B, the display panel DP may include the display layer DP-ED and a circuit layer DP-CL.

The display layer DP-ED may be a component which substantially generates an image. The display layer DP-ED may be a light emitting type display layer, and for example, the display layer DP-ED may be an organic light emitting display layer, an inorganic light emitting display layer, an organic-inorganic light emitting layer, a quantum-dot display layer, a micro-LED display layer, or a nano-LED display layer.

The circuit layer DP-CL may include at least one insulation layer, semiconductor patterns, and conductive patterns. The insulation layer includes at least one inorganic layer and at least one organic layer. The semiconductor patterns, and the conductive patterns may constitute signal lines, a pixel driving circuit, and a scan driving circuit.

The power supply module PSM may supply power for the overall operation of the electronic device ED. The power supply module PSM may include a typical battery module.

The electronic module EM may include various functional modules for operating the electronic device ED. The electronic module EM may be directly mounted on a motherboard electrically connected to the display panel DP, or may be mounted on a separate substrate to be electrically connected to the motherboard through a connector (not shown) or the like.

The electronic module EM may include a control module CM, a wireless communication module TM, an image input module IIM, an audio input module AIM, a memory MM, an external interface IF, and an audio output module AOM.

The control module CM controls the overall operation of the electronic device ED. The control module CM may be a microprocessor. In an embodiment, for example, the control module CM either activates or deactivates the display panel DP. The control module CM may control other modules, such as the image input module IIM or the audio input module AIM, based on an input signal, e.g., a touch signal received from the display panel DP.

The wireless communication module TM may communicate with an external electronic device via a first network (e.g., a short-range communication network such as Bluetooth, WiFi direct, or an infrared data association (IrDA)) or a second network (e.g., a long-range communication network such as a cellular network, the Internet, or a computer network (e.g., a LAN or WAN)). Communication modules included in the wireless communication module TM may be integrated into one component (e.g., a single chip), or may be implemented as a plurality of components (e.g., a plurality of chips) separated from each other. The wireless communication module TM may transmit/receive voice signals using a general communication line. The wireless communication module TM may include a transmission unit TM1 for modulating and then transmitting a signal to be transmitted, and a reception unit TM2 for demodulating a received signal.

The image input module IIM processes an image signal and converts the processed image signal into image data displayable on the display panel DP. The audio input module AIM receives an external sound signal through a microphone in a recording mode, a voice recognition mode, and the like, and converts the received external sound signal into electrical voice data.

The external interface IF may include a connector capable of physically connecting the electronic device ED and the external electronic device. In an embodiment, for example, the external interface IF serves as an interface which is connected to an external charger, a wired/wireless data port, a card (e.g., a memory card, a SIM/UIM card), a socket, or the like.

The audio output module AOM converts audio data received from the wireless communication module TM or audio data stored in the memory MM and outputs the converted audio data to the outside.

The electronic optical module EOM may receive an external input transmitted to the electronic device ED, or provide an output to the outside of the electronic device ED. The electronic optical module EOM may include, for example, at least one of a light emitting module LTM, the sensor module SM, or the camera module CAM.

The light emitting module LTM generates and then outputs light. The light emitting module LTM may output infrared rays. The light emission module LTM may include an LED element. The sensor module LM may sense infrared rays. The sensor module SM may be activated when infrared rays of a predetermined level or higher are sensed. The sensor module SM may include a complementary metal-oxide semiconductor (CMOS) sensor. After infrared light generated in the light emitting module LTM is output, the infrared light is reflected by an external object (such as a user's finger or face), and the reflected infrared light may be incident on the sensor module SM.

The camera module CAM may capture still images and moving images. The camera module CAM may be provided in plurality. Some of the camera modules CAM may overlap the through-hole HH. The external input (e.g., light) may be provided to the camera module CAM through the through-hole HH. In an embodiment, for example, the camera module CAM may capture external images by receiving natural light through the through-hole HH.

Figure 3:
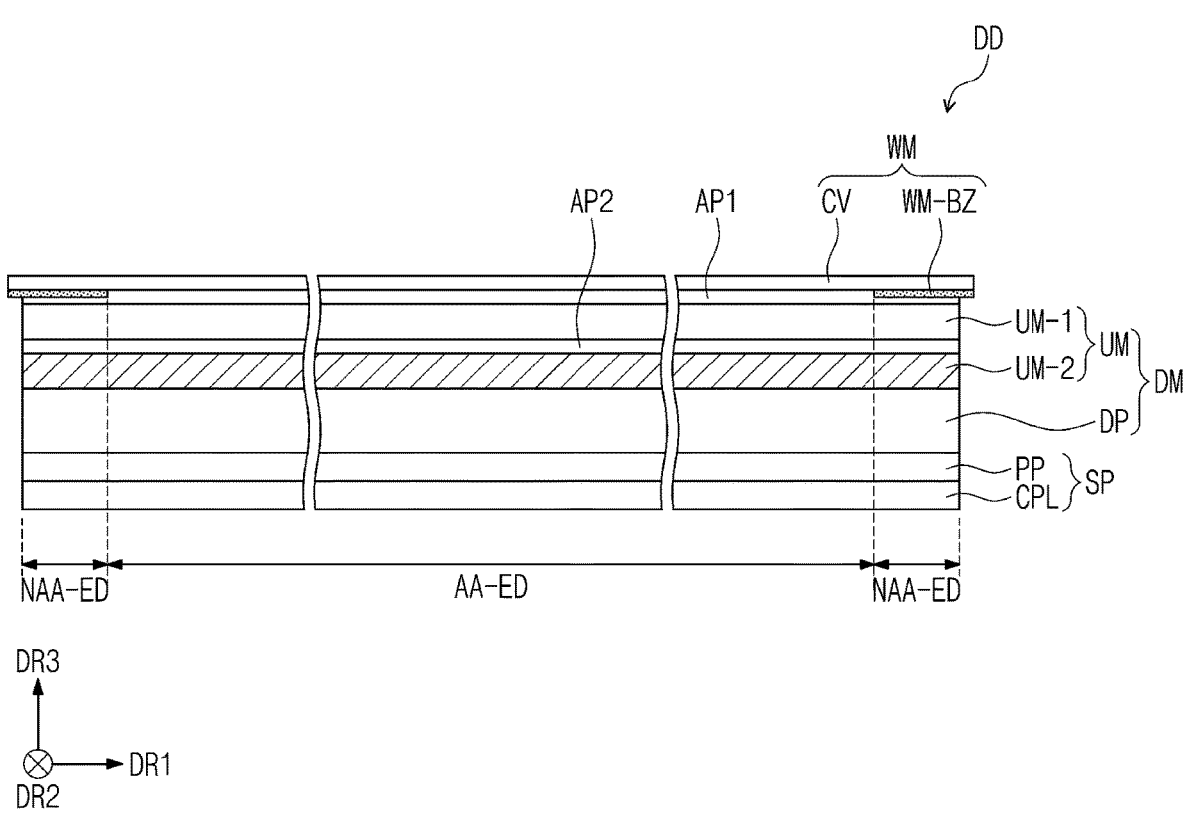
FIG. 3 is a cross-sectional view showing some components of a display device according to an embodiment of the invention.

FIG. 3 is a cross-sectional view showing some components of the display device DD according to an embodiment of the invention.

Referring to FIG. 3, the display device DD according to an embodiment of the invention may include the window WM, the upper member UM, the display panel DP, and the lower member SP.

In an embodiment, the window WM may cover the front surface of the display panel DP. The window WM may include a cover member CV and a bezel pattern WM-BZ. The cover member CV includes a transparent base layer such as a glass substrate or a transparent film. The bezel pattern WM-BZ may have a multi-layered structure. The multi-layered structure may include a colored color layer and a black light blocking layer. The colored color layer and the black light blocking layer may be formed through deposition, printing, and coating processes. In an alternative embodiment, the bezel pattern WM-BZ may be omitted from the window WM, and may be formed on the upper member UM rather than the cover member CV. In an embodiment, although not illustrated, the window WM may further include functional layers disposed on at least one surface of the cover member CV. In an embodiment, for example, the window WM may include at least one selected from a hard coating layer, a contamination prevention layer and a fingerprint prevention layer disposed on one surface of the cover member CV.

In an embodiment, the upper member UM includes a reflection prevention layer UM-1 and an input sensor UM-2. In an embodiment, as illustrated in FIG. 3, the window WM and the reflection prevention layer UM-1 may be coupled to each other through a first module adhesive layer AP1, and the input sensor UM-2 may be coupled through a second module adhesive layer AP2. In an embodiment, the first module adhesive layer AP1 or the second module adhesive layer AP2 may be omitted. In an embodiment, for example, the second module adhesive layer AP2 may be omitted, and the reflection prevention layer UM-1 may be directly disposed on the input sensor UM-2.

The reflection prevention layer UM-1 may lower reflectance of external light. The reflection prevention layer UM-1 may include a phase retarder and/or a polarizer. The reflection prevention layer UM-1 may include a polarizing film or color filters. The color filters may have a predetermined arrangement. The arrangement of the color filters may be determined in consideration of light emitting colors of pixels included in the display panel DP. The reflection prevention layer UM-1 may further include a partition layer adjacent to the color filters.

The input sensor UM-2 may include a plurality of sensing electrodes (now shown) for sensing an external input, trace lines (not shown) connected to the plurality of sensing electrodes, and an inorganic layer and/or an organic layer for insulating/protecting the plurality of sensing electrodes or the trace lines. The input sensor UM-2 may be a capacitive sensor, but is not particularly limited thereto.

When manufacturing the display panel DP, the input sensor UM-2 may be directly formed on a thin film encapsulation layer through a continuous process. However, the embodiment of the invention is not limited thereto, and alternatively, the input sensor UM-2 may be manufactured as a separate panel from the display panel DP, and be adhered to the display panel DP by an adhesive layer.

The lower member SP may include a protective film PP and a functional layer CPL. The protective film PP may be disposed below the display panel DP, and the functional layer CPL may be disposed below the protective film PP.

The protective film PP may be a component which is disposed below the display panel DP to support the display panel DP, while increasing resistance of the display panel DP by increasing resistance against compressive force caused by external pressing. The protective film PP may include a flexible plastic material such as polyimide or polyethylene terephthalate. The protective film PP may be a colored film with low light transmittance. In an embodiment, the protective film PP may be omitted in the lower member SP. In such an embodiment where the protective film PP is omitted, the functional layer CPL may be directly disposed below the display panel DP.

The functional layer CPL may be a component which is disposed below the protective film PP, absorbs an impact applied to the display panel DP, and dissipates heat generated in components disposed below the display panel DP. The functional layer CPL may include, for example, an impact absorption layer and a heat dissipation layer. In an embodiment, for example, heat generated in the electronic module EM (see FIG. 2A) and the power supply module PSM (see FIG. 2A) of the electronic device ED (see FIG. 2A) described above may be dissipated by the functional layer CPL. The functional layer CPL may include a metal plate which absorbs an impact applied to the display panel DP and supports the display panel DP.

Figure 4:
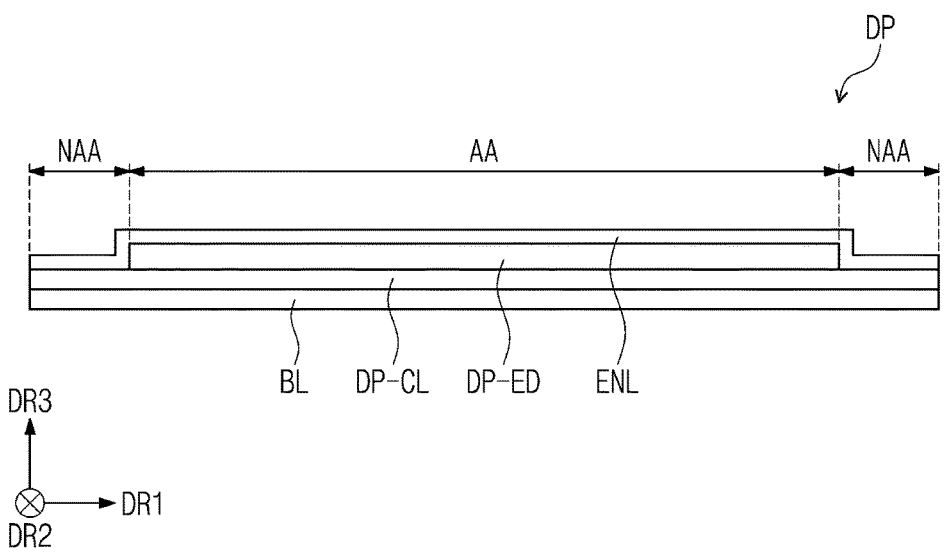
FIG. 4 is a cross-sectional view of a display panel according to an embodiment of the invention.

FIG. 4 is a cross-sectional view of a display panel DP according to an embodiment of the invention.

In an embodiment, the display panel DP includes a base layer BL, the circuit layer DP-CL disposed on the base layer BL, the display layer DP-ED, and an encapsulation layer ENL.

The base layer BL may include a plastic substrate, a glass substrate, a metal substrate, an organic/inorganic composite material substrate, or the like. In an embodiment, for example, the base layer BL may include at least one polyimide layer. The above-described lower member SP may be disposed on a lower portion of the base layer BL.

The circuit layer DP-CL includes at least one insulation layer, semiconductor patterns, and conductive patterns. The insulation layer includes at least one inorganic layer and at least one organic layer. The semiconductor patterns, and the conductive patterns may constitute signal lines, a pixel driving circuit, and a scan driving circuit. In addition, the circuit layer DP-CL may include a rear-surface metal layer.

The display layer DP-ED includes a display element, for example, a light emitting element. In an embodiment, for example, the light emitting element may be an organic light emitting element, a quantum dot light emitting element, a micro-LED light emitting element, a nano-LED light emitting element, or the like. The display layer DP-ED may further include an organic layer such as a pixel definition film.

The display layer DP-ED may be disposed in the display region AA. The non-display region NAA is disposed at the outer periphery of the display region AA to surround the display region AA, and a light emitting element may not be disposed in the non-display region NAA.

The encapsulation layer ENL may be disposed on the display layer DP-ED and cover the display layer DP-ED. The encapsulation layer ENL may be disposed on the circuit layer DP-CL to encapsulate the display layer DP-ED. The encapsulation layer ENL may be a thin film encapsulation layer including a plurality of organic thin films and an inorganic thin film. The encapsulation layer ENL may include a thin film encapsulation layer including a laminate structure of an inorganic layer/an organic layer/an inorganic layer. The laminate structure of the encapsulation layer ENL is not particularly limited.

Hereinafter, an embodiment of a method for manufacturing the display device DD included in the electronic device ED described with reference to FIG. 1 to FIG. 4 will be described.

Figure 5:
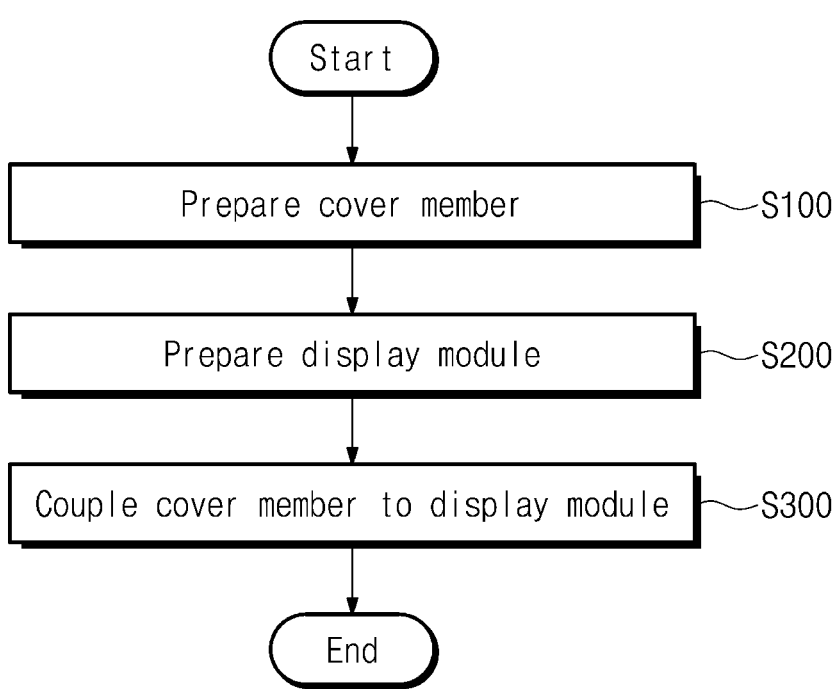
FIG. 5 is a flow chart of a method for manufacturing a display device according to an embodiment of the invention.
Figure 6:
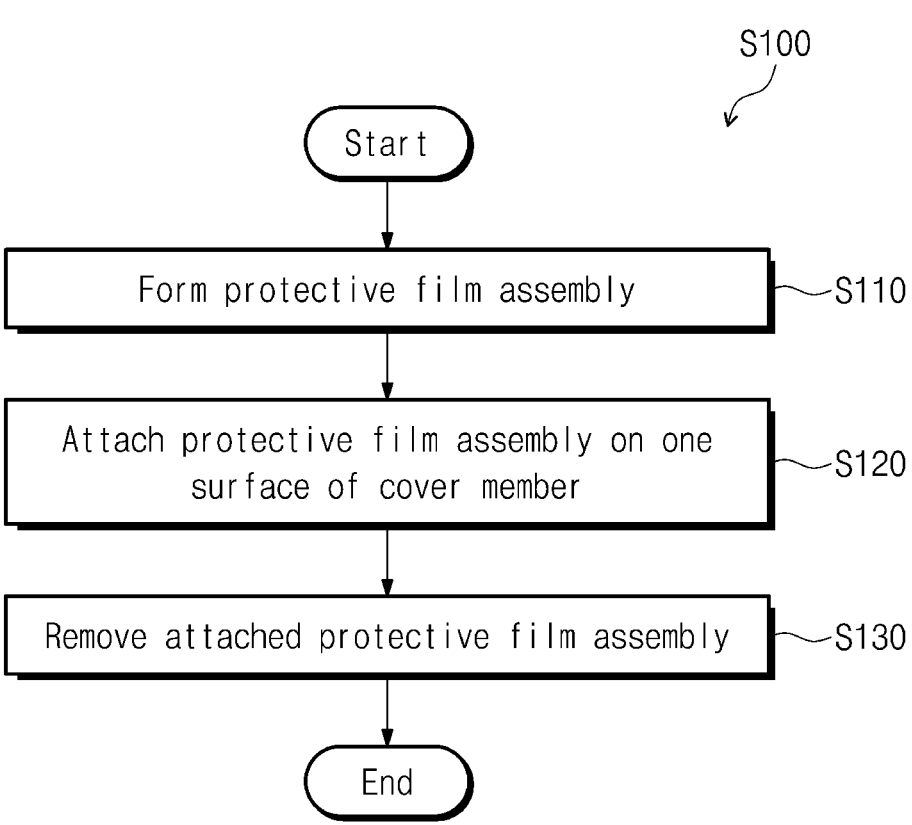
FIG. 6 is a flow chart of processes of a method for manufacturing a display device according to an embodiment of the invention.
Figure 7:
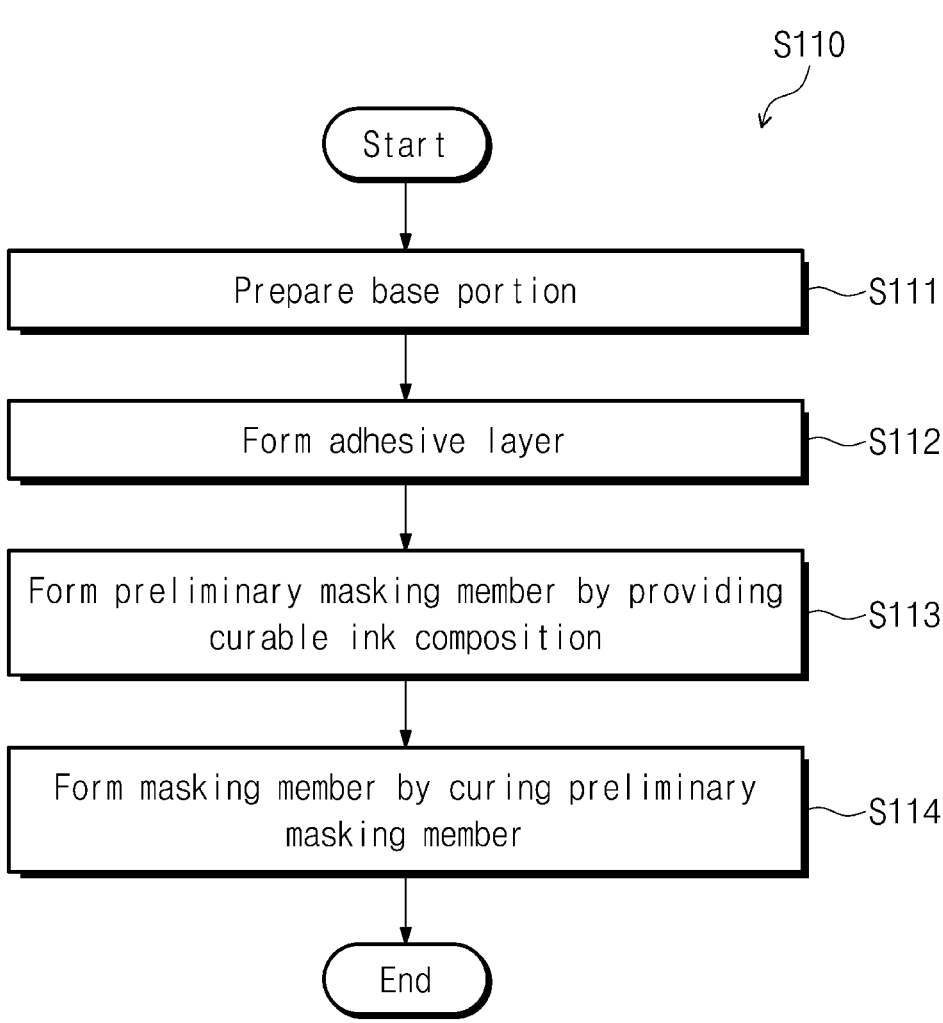
FIG. 7 is a flow chart of processes of a method for manufacturing a display device according to an embodiment of the invention.

FIG. 5 is a flow chart of a method for manufacturing a display device according to an embodiment of the invention. FIG. 6 is a flow chart of some processes of a method for manufacturing a display device according to an embodiment of the invention. FIG. 7 is a flow chart of some processes of a method for manufacturing a display device according to an embodiment of the invention.

Referring to FIG. 5, the method for manufacturing a display device according to an embodiment of the invention includes preparing a cover member S100, preparing a display module S200, and coupling the cover member to the display module S300.

Referring to FIG. 3 and FIG. 5 together, the display device DD according to an embodiment includes the cover member CV and the display module DM, and the method for manufacturing the display device DD includes preparing each of the cover member CV and the display module DM and coupling the cover member CV and the display module DM together. The cover member CV and the display module DM may each be manufactured through a separate process, and then coupled together by interposing the first module adhesive layer AP1 or the like. In an embodiment, the cover member CV may have the bezel pattern WM-BZ printed on one surface thereof, and then be coupled to the display module DM through the first module adhesive layer AP1.

FIG. 6 is a flow chart showing processes included in the preparing of a cover member S100 of the method for manufacturing a display device according to an embodiment of the invention. Referring to FIG. 6, the preparing of a cover member S100 includes forming a protective film assembly S110, and attaching the protective film assembly on at least one surface of the cover member S120. The preparing of a cover member S100 may further include, after the attaching of the protective film assembly on at least one surface of the cover member S120, removing the protective film assembly attached on at least one surface of the cover member.

Referring to FIG. 3, FIG. 5, and FIG. 6 together, the cover member CV may go through transferring and processing while being attached on at least one surface of a protective film assembly PF (see FIG. 8A) to be described layer, and then coupled to the display module DM after the protective film assembly PF (see FIG. 8A) attached to the cover member CV is removed. The protective film assembly PF (see FIG. 8A) may perform a function of preventing the cover member CV from being damaged by an external impact, or preventing foreign substances or the like from being coupled on the surface of the cover member CV while the cover member CV goes through the transferring and processing.

FIG. 7 is a flow chart showing processes included in the forming of a protective film assembly S110 included in the preparing of a cover member S100 (see FIG. 6) of the method for manufacturing a display device according to an embodiment of the invention. Referring to FIG. 7, the forming of a protective film assembly S110 includes preparing a base part including a first portion overlapping the cover member and a second portion protruding from the first portion S11, forming an adhesive layer on the base part S112, forming a preliminary masking member on the adhesive layer by providing a curable ink composition to overlap the second portion S113, and forming a masking member by curing the preliminary masking member S114. After the forming of a masking member S114, the prepared protective film assembly may be attached on at least one surface of the cover member CV (see FIG. 3).

Figure 8A:
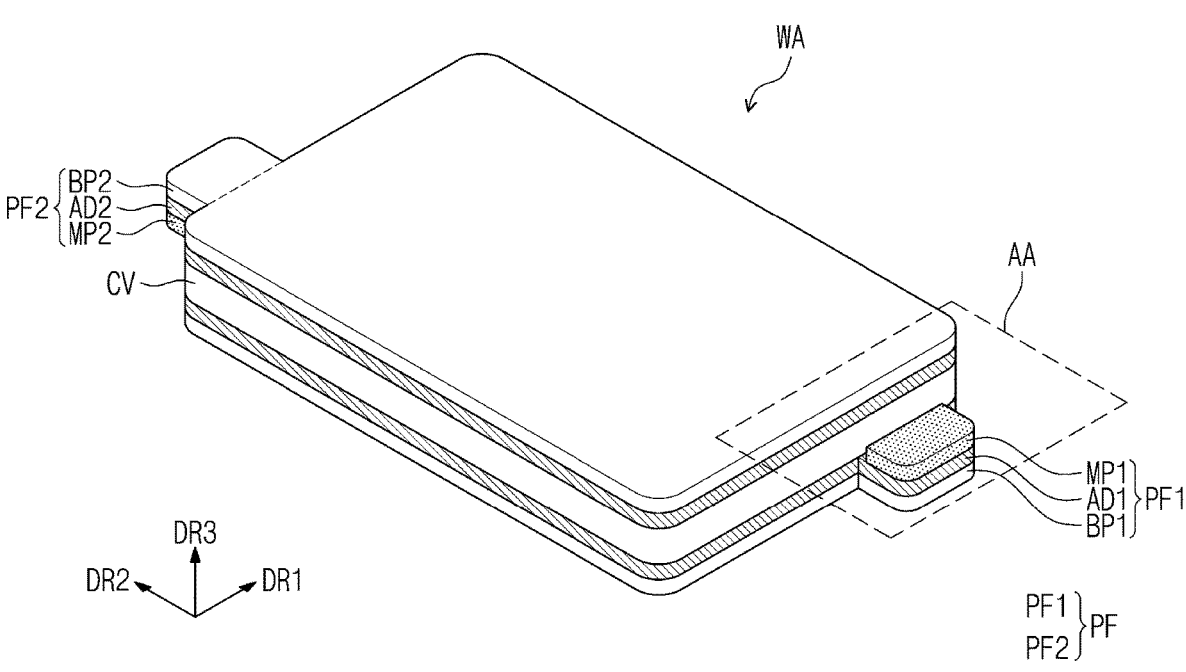
FIG. 8A is a perspective view of a window assembly according to an embodiment of the invention.
Figure 8B:
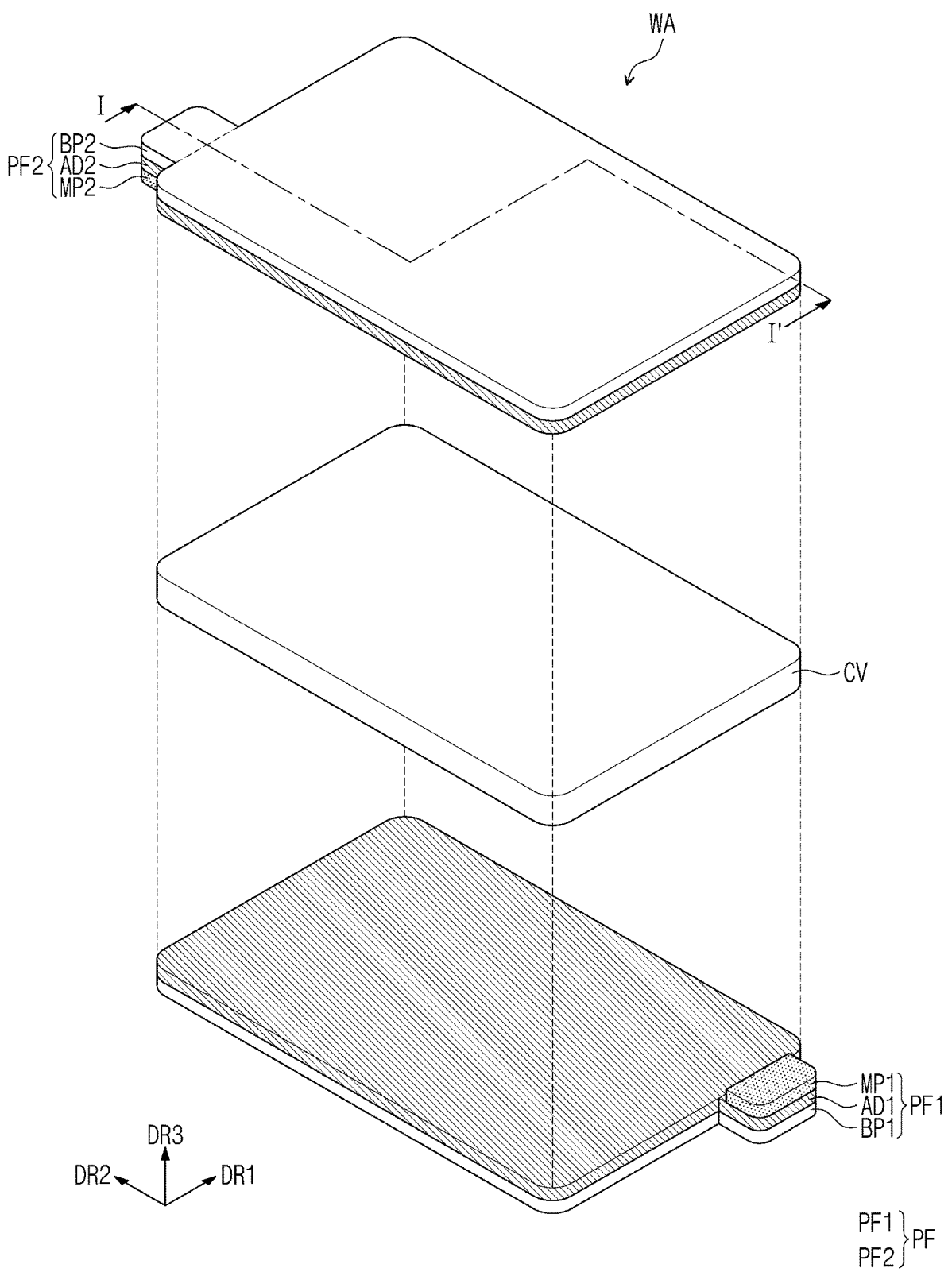
FIG. 8B is an exploded perspective view of a window assembly according to an embodiment of the invention.
Figure 9:
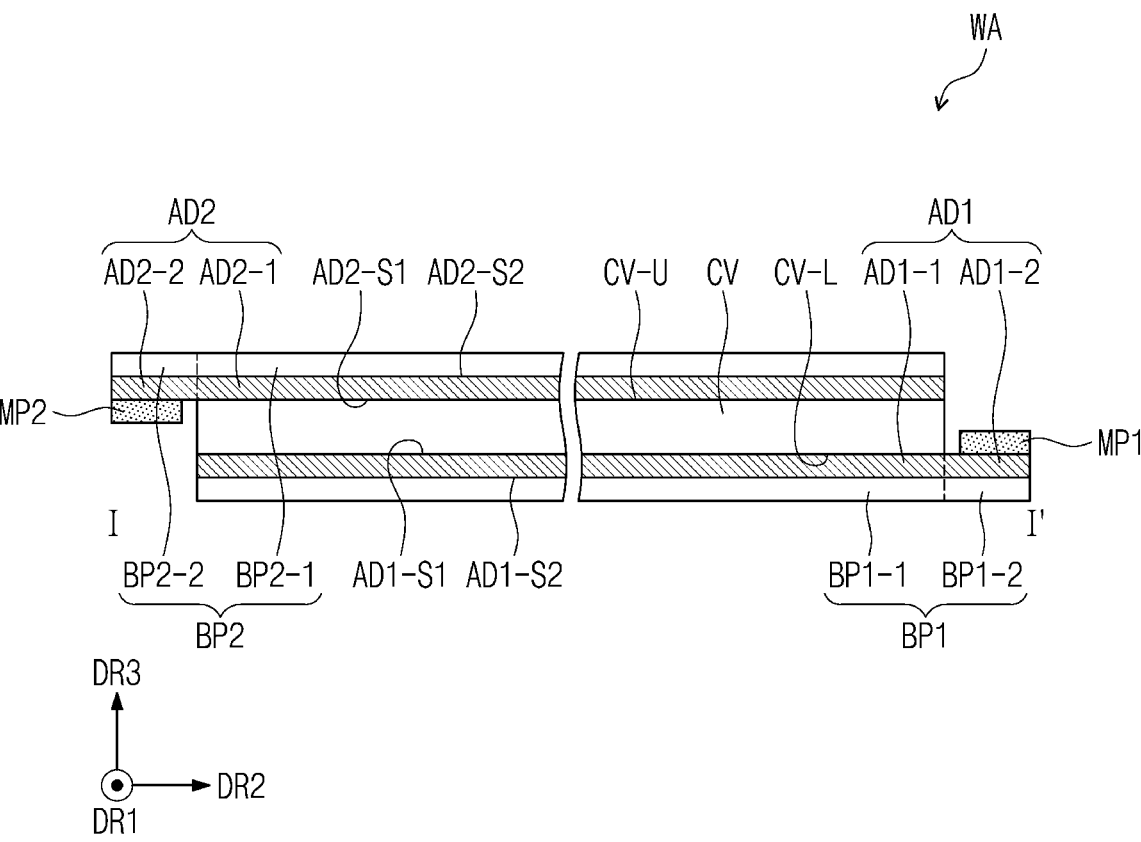
FIG. 9 is a cross-sectional view of a window assembly according to an embodiment of the invention.

FIG. 8A is a perspective view of a window assembly according to an embodiment of the invention. FIG. 8B is an exploded perspective view of a window assembly according to an embodiment of the invention. FIG. 9 is a cross-sectional view of a window assembly according to an embodiment of the invention.

A window assembly WA according to an embodiment illustrated in FIG. 8A, FIG. 8B, and FIG. 9 may be in one state in which the protective film assembly PF is coupled on at least one surface of the cover member CV in the preparing of the cover member CV S100 (see FIG. 7) described above. That is, the window assembly WA illustrated in FIG. 8A, FIG. 8B, and FIG. 9 may be in a state after the attaching of the protective film assembly PF on at least one surface of the cover member CV S120 (see FIG. 7) of the preparing of the cover member CV S100 (see FIG. 7). FIG. 9 illustrates a cross-section taken along line I-I' illustrated in FIG. 8B.

Referring to FIG. 8A, FIG. 8B, and FIG. 9 together, the window assembly WA according to an embodiment includes the cover member CV, and the protective film assembly PF disposed on at least one surface of the cover member CV. As illustrated in FIG. 8A, FIG. 8B, and FIG. 9, the protective film assembly PF may be disposed on each of a front surface CV-U and a rear surface CV-L of the cover member CV. However, the embodiment of the invention is not limited thereto, and the protective film assembly PF may be attached to only one of the front surface CV-U and the rear surface CV-L of the cover member CV, and the protective film assembly PF may not be attached to the other surface of the front surface CV-U and the rear surface CV-L of the cover member CV. The protective film assembly PF may include a first protective film assembly PF1 attached to the front surface CV-U of the cover member CV and a second protective film assembly PF2 attached to the rear surface CV-L of the cover member CV. Any one of the first protective film assembly PF1 and the second protective film assembly PF2 may be omitted.

The protective film assembly PF includes base parts BP1 and BP2, adhesive layers AD1 and AD2, and masking members MP1 and MP2. The first protective film assembly PF1 and the second protective film assembly PF2 may each include the base parts BP1 and BP2, the adhesive layers AD1 and AD2, and the masking members MP1 and MP2. The first protective film assembly PF1 may include a first base part BP1, a first adhesive layer AD1, and a first masking member MP1, and the second protective film assembly PF2 may include a second base part BP2, a second adhesive layer AD2, and a second masking member MP2.

In an embodiment, as shown in FIG. 9, the base parts BP1 and BP2 include first portions BP1-1 and BP2-1 and second portions BP1-2 and BP2-2. The first base part BP1 may include a first portion (hereinafter, also referred to as "1-1 portion") BP1-1 and a second portion ((hereinafter, also referred to as "1-2 portion") BP1-2. The second base part BP2 may include a first portion (hereinafter, also referred to as "2-1 portion") BP2-1 and a second portion (hereinafter, also referred to as "2-2 portion") BP2-2.

The first portions BP1-1 and BP2-1 are portion overlapping the cover member CV on a plane (or when viewed in third direction DR3 or a thickness direction of the window assembly WA) in the window assembly WA. The first portions BP1-1 and BP2-1 may be portions overlapping the cover member CV on a plane in a state in which the protective film assembly PF is attached to the cover member CV. The first portions BP1-1 and BP2-1 may entirely overlap the cover member CV. The first portions BP1-1 and BP2-1 of the base parts BP1 and BP2 have shapes the same as or substantially similar to that of the cover member CV, and may be disposed to overlap the cover member CV to substantially cover the cover member CV.

The second portions BP1-2 and BP2-2 are portions protruding from the first portions BP1-1 and BP2-1 in the second direction DR2 (or a longitudinal direction of the window assembly WA). The second portions BP1-2 and BP2-2 are portions protruding outward from the first portions BP1-1 and BP2-1, and may be portion not overlapping the cover member CV on a plane. The second portions BP1-2 and BP2-2 may protrude outward to be used by a user as a handle for easily removing the protective film assembly PF when the protective film assembly PF is removed from the window assembly WA in the method for manufacturing a display device.

The first portions BP1-1 and BP2-1 and the second portions BP1-2 and BP2-2 may have a shape of a single body. The second portions BP1-2 and BP2-2 may not be provided as a separate component and provided on one side of the first portions BP1-1 and BP2-1, but may have a shape of a single body protruding from the first portions BP1-1 and BP2-1. That is, the first portions BP1-1 and BP2-1 may be integrally formed with each other as a single unitary and indivisible part, and the second portions BP1-2 and BP2-2 may be integrally formed with each other as a single unitary and indivisible part.

In each of the first base part BP1 and the second base part BP2 which are respectively included in the first protective film assembly PF1 and the second protective film assembly PF2, the first portions BP1-1 and BP2-1 may overlap each other, and the second portions BP1-2 and BP2-2 may not overlap each other. Each of the 1-1 portion BP1-1 and the 2-1 portion BP2-1 overlaps the cover member CV on a plane, so that the 1-1 portion BP1-1 and the 2-1 portion BP2-1 may overlap each other. Each of the 1-2 portion BP1-2 and the 2-2 portion BP2-2 protrudes from the first portions BP1-1 and BP2-1, and may be positioned not to overlap each other on a plane.

The base parts BP1 and BP2 may include at least one selected from polyethylene terephthalate (PET), polyurethane (PU), polyimide (PI), polycarbonate (PC), polyethylene (PE), polypropylene (PP), polysulfone (PSF), polymethyl methacrylate (PMMA), triacetyl cellulose (TAC), cycloolefin polymer (COP), and a combination thereof. In an embodiment, for example, the base parts BP1 and BP2 may include polyethylene terephthalate (PET).

The adhesive layers AD1 and AD2 are provided on one surface of the base parts BP1 and BP2. At least a portion of the adhesive layers AD1 and AD2 may be disposed between the cover member CV and the base parts BP1 and BP2 to couple the cover member CV and the base parts BP1 and BP2. First adhesive surfaces AD1-S1 and AD2-S1, which are one surface of the adhesive layers AD1 and AD2, may be in contact with the cover member CV, and second adhesive surfaces AD1-S2 and AD2-S2 opposite to the first adhesive surfaces AD1-S1 and AD2-S1 may be in contact with the base parts BP1 and BP2. That is, components other than the adhesive layers AD1 and AD2 may not be interposed between the cover member CV and the base parts BP1 and BP2. The adhesive layers AD1 and AD2 may be provided as a single layer between the cover member CV and the base parts BP1 and BP2.

The adhesive layers AD1 and AD2 may include or be formed of relatively low adhesive layers including surface having an adhesion force lower than a predetermined adhesion force. The first adhesive surfaces AD1-S1 and AD2-S1 of the adhesive layers AD1 and AD2 may be surfaces having lower adhesion force than the second adhesive surfaces AD1-S2 and AD2-S2 of the adhesive layers AD1 and AD2. Since the first adhesive surfaces AD1-S1 and AD2-S1, which are in contact with the cover member CV, have lower adhesion force than the second adhesive surfaces AD1-S2 and AD2-S2, which are in contact with the base parts BP1 and BP2, the protective film assembly PF may be easily removed in the removing of the protective film assembly PF attached on one surface of cover member CV S130 later (see FIG. 6).

The adhesive layers AD1 and AD2 may include a first adhesive layer AD1 disposed between the first base part BP1 and the cover member CV, and a second adhesive layer AD2 disposed between the second base part BP2 and the cover member CV.

The adhesive layers AD1 and AD2 may include first adhesive portions AD1-1 and AD2-1 and second adhesive portions AD1-2 and AD2-2. The first adhesive portions AD1-1 and AD2-1 may overlap the first portions BP1-1 and BP2-1 of the base parts BP1 and BP2, and the second adhesive portions AD1-2 and AD2-2 may overlap the second portions BP1-2 and BP2-2 of the base parts BP1 and BP2. The first adhesive layer AD1 may include a first adhesive portion (hereinafter, also referred to as "1-1 adhesive portion") AD1-1 and a second adhesive portion (hereinafter, also referred to as "1-2 adhesive portion") AD1-2. The second adhesive layer AD2 may include a first adhesive portion (hereinafter, also referred to as "2-1 adhesive portion") AD2-1 and a second adhesive portion (hereinafter, also referred to as "2-2 adhesive portion") AD2-2.

The first adhesive portions AD1-1 and AD2-1 may be portions disposed between the base parts BP1 and BP2 and the cover member CV. The second adhesive portions AD1-2 and AD2-2 may be portions not overlapping the cover member CV.

The masking members MP1 and MP2 are disposed on the adhesive layers AD1 and AD2, and overlap at least a portion of the second portions BP1-2 and BP2-2 of the base parts BP1 and BP2. The masking members MP1 and MP2 may overlap the second portions BP1-2 and BP2-2 of the base parts BP1 and BP2, and may overlap the second adhesive portions AD1-2 and AD2-2 of the adhesive layers AD1 and AD2. The masking members MP1 and MP2 may be disposed on the second adhesive portions AD1-2 and AD2-2 of the adhesive layers AD1 and AD2. An adhesive layers AD1 and AD2 may be interposed between the masking members MP1 and MP2 and the base parts BP1 and BP2. The second adhesive portions AD1-2 and AD2-2 of the adhesive layers AD1 and AD2 may be interposed between the masking members MP1 and MP2 and the second portions BP1-2 and BP2-2 of the base parts BP1 and BP2. In an embodiment, only the adhesive layers AD1 and AD2 may be interposed between the masking members MP1 and MP2 and the base parts BP1 and BP2, and other components may not be provided between the masking members MP1 and MP2 and the base parts BP1 and BP2. The adhesive layers AD1 and AD2 disposed between the masking members MP1 and MP2 and the base parts BP1 and BP2 may be provided as a single layer which does not have a multi-layered structure.

The masking members MP1 and MP2 may be disposed on the first adhesive surfaces AD1-S1 and AD2-S1 to which the cover member CV is attached among adhesive surfaces of the adhesive layers AD1 and AD2. The masking members MP1 and MP2 may be attached to a surface to which the cover member CV is attached among the adhesive surfaces of the adhesive layers AD1 and AD2.

The masking members MP1 and MP2 may include a material having low adhesion force. The masking members MP1 and MP2 may prevent the adhesive layers AD1 and AD2 from adhering to a user's hand when the user grips the second portions BP1-2 and BP2-2, which are a handle portion, when the user removes the protective film assembly PF. In addition, the masking members MP1 and MP2 cover the second adhesive portions AD1-2 and AD2-2 of the adhesive layers AD1 and AD2, which are exposed while the cover member CV coupled with the protective film assembly PF goes through transferring and processing, and thus, may effectively prevent the second adhesive portions AD1-2 and AD2-2 from being contaminated by process foreign substances or the like.

The masking members MP1 and MP2 are derived from a curable ink composition. The masking members MP1 and MP2 may be formed by providing the curable ink composition through an inkjet process. The masking members MP1 and MP2 may be formed by providing the curable ink composition, and then curing the curable ink composition through a curing process. The masking members MP1 and MP2 may include a curable resin. The masking members MP1 and MP2 may further include a curing initiator. The curable resin, which is a curing base material, may be included in the curable ink composition provided to form the masking members MP1 and MP2, and there may be some residual curing initiator remaining in the masking members MP1 and MP2 formed after the curing process. The masking members MP1 and MP2 may be formed by solidifying a liquid curing base material included in the curable ink composition through a curing reaction. The curing initiator may be, for example, a photoinitiator.

The masking members MP1 and MP2 may include an acrylic resin as the curable resin. The masking members MP1 and MP2 may include an acrylic polymer material as the curable base material.

Figure 10:
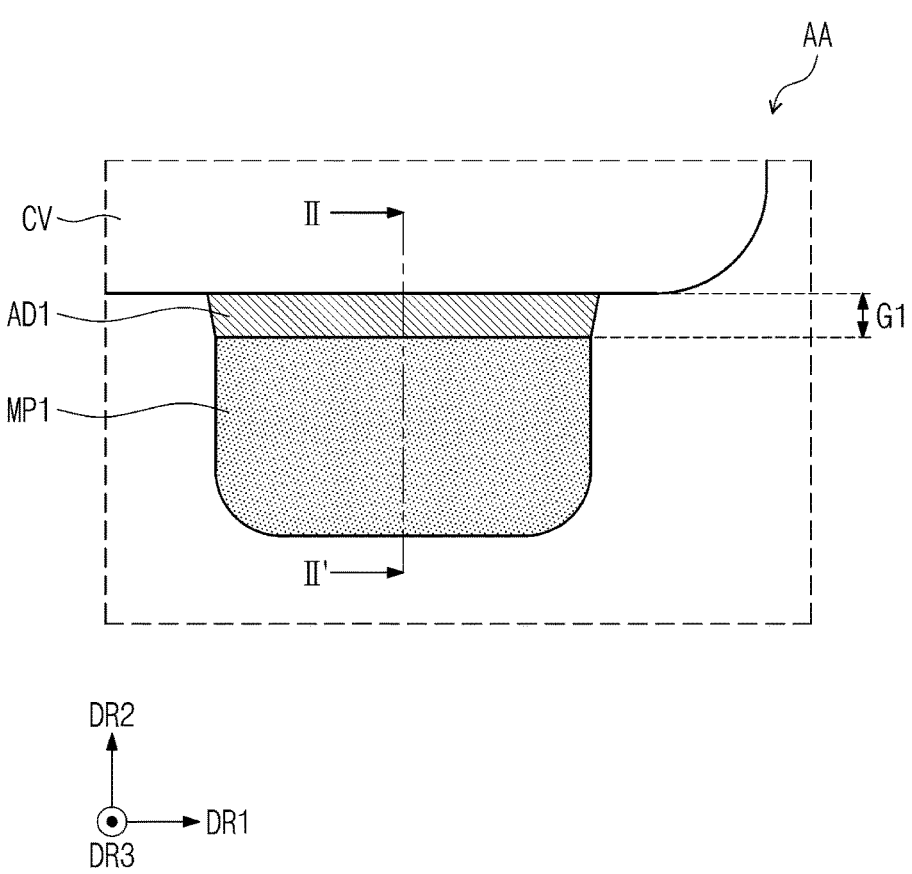
FIG. 10 is a plan view of a portion of a window assembly according to an embodiment of the invention.
Figure 11:
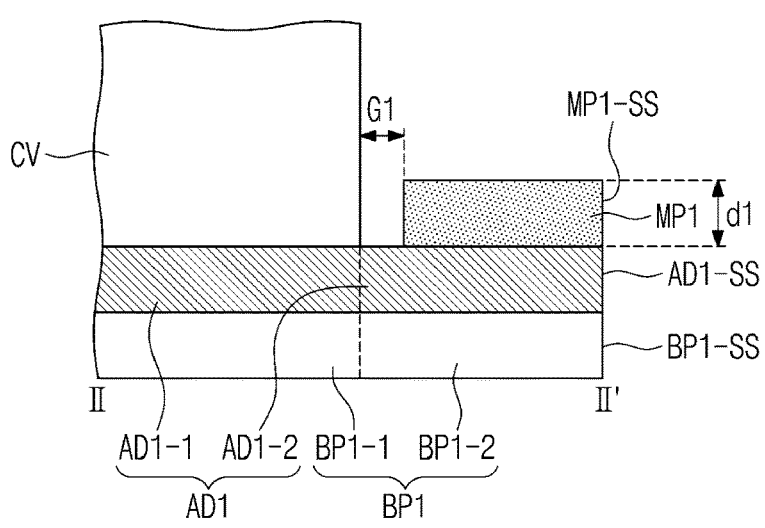
FIG. 11 is a cross-sectional view of a portion of a window assembly according to an embodiment of the invention.

FIG. 10 is a plan view of a portion of a window assembly according to an embodiment of the invention. FIG. 11 is a cross-sectional view of a portion of a window assembly according to an embodiment of the invention. FIG. 10 illustrates an enlarged plan view of a portion corresponding to the region AA illustrated in FIG. 8A. FIG. 11 illustrates a cross-section taken along line II-II' illustrated in FIG. 10.

Referring to FIG. 9, FIG. 10, and FIG. 11 together, in the window assembly WA according to an embodiment, the masking members MP1 and MP2 may overlap a portion of the second portions BP1-2 and BP2-2 and may not overlap the remaining portion. That is, the masking members MP1 and MP2 may cover a portion of the second adhesive portions AD1-2 and AD2-2, and may expose the remaining portion without covering the remaining portion. However, the embodiment of the invention is not limited thereto, and the masking members MP1 and MP2 may overlap all of the second portions BP1-2 and BP2-2 to entirely cover surfaces of the second adhesive portions AD1-2 and AD2-2 without exposing any portion of the surfaces.

As illustrated in FIG. 10 and FIG. 11, in an embodiment where the masking members MP1 and MP2 do not overlap a portion of the second portions BP1-2 and BP2-2, the masking members MP1 and MP2 may be spaced apart from the cover member CV in one direction. The masking members MP1 and MP2 may be spaced apart from the cover member CV by a first gap G1 in the second direction DR2. In an embodiment, the first gap G1 may be about 0.2 millimeter (mm) or less. The first gap G1 may be in a range of about 0 to about 0.2 mm. In an embodiment, where the first gap G1 is "0," the masking members MP1 and MP2 and the cover member CV are not spaced apart from each other, but are in contact with each other. In such an embodiment where the first gap G1 is "0," the masking members MP1 and MP2 overlap an entire portion of the second portions BP1-2 and BP2-2. The masking members MP1 and MP2 according to an embodiment are derived from a curable ink composition as described above, and since the curable ink composition is provided and formed through an inkjet process, the first gap G1 may have a small value of about 0.2 mm or less.

The masking members MP1 and MP2 may have a predetermined thickness along the third direction DR3, which is a thickness direction of the window assembly. A thickness d1 of the masking members MP1 and MP2 may be in a range from about 3 micrometers to about 20 micrometers. The thickness d1 of the masking members MP1 and MP2 may be, for example, about 5 micrometers to about 7 micrometers. The masking members MP1 and MP2 are derived from a curable ink composition as described above, and since the curable ink composition is provided and formed through an inkjet process, the masking members MP1 and MP2 have the thickness d1 in the above range.

In an embodiment, as illustrated in FIG. 11, one side surface MP1-SS of the masking member MP1, one side surface BP1-SS of the second portion BP1-2, and one side surface AD1-SS of the second adhesive portion AD1-2 may define a single aligned side surface. The masking member MP1 is derived from a curable ink composition as described above, and may be formed through an inkjet process such that one side surface MP1-SS is aligned with each of one side surface BP1-SS of the second portion BP1-2 and one side surface AD1-SS of the second adhesive portion AD1-2. Accordingly, a punch (or cutting) process for aligning side surfaces may be omitted, so that it is possible to prevent a residual adhesive of the adhesive layer AD1 from being generated which may occur in the punch process.

In the window assembly WA according to an embodiment, the protective film assembly PF provided on at least one surface of the cover member CV includes the masking members MP1 and MP2, and the masking members MP1 and MP2 are derived from a curable ink composition, where the curable ink composition is provided and formed through an inkjet process. Accordingly, a gap between the masking members MP1 and MP2 and the cover member CV is reduced, so that it is possible to prevent an exposed surface of the adhesive layers AD1 and AD2 from being contaminated by foreign substances, and to prevent a defect in which the masking members MP1 and MP2 are detached in the middle of processing, and thus, the durability and process reliability of the window assembly WA may be improved.

A masking member (hereinafter, "a typical masking member") provided in a conventional protective film assembly has a structure in which a polyethylene terephthalate (PET) film or the like is bonded through a separate additional adhesive layer, so that the total thickness of the typical masking member may be greater than that of the masking members MP1 and MP2 according to an embodiment which is derived from a curable ink composition, and since the typical masking member bonded through the separate additional adhesive layer is desired to secure a process margin for an attachment process, a gap between the typical masking member and a cover member is as great as about 0.3 mm or greater. In addition, there may be a defect in which the typical masking member attached through the separate additional adhesive layer is detached in the middle of processing and act as a foreign substance generated during the process.

In an embodiment of the invention, the masking members MP1 and MP2 included in the window assembly WA is derived from a curable ink composition unlike the typical masking member, a process margin may not be considered in the attachment process, so that it is possible to minimize a gap between the masking members MP1 and MP2 and the cover member CV, and accordingly, the area in which surfaces of the adhesive layers AD1 and AD2 are exposed is also minimized to prevent contamination caused by a foreign substance generated during the process. In addition, the probability that the masking members MP1 and MP2 formed through the inkjet process are detached in the middle of processing may be reduced, so that the probability that foreign substances are generated during the process may be reduced.

Figure 12A:
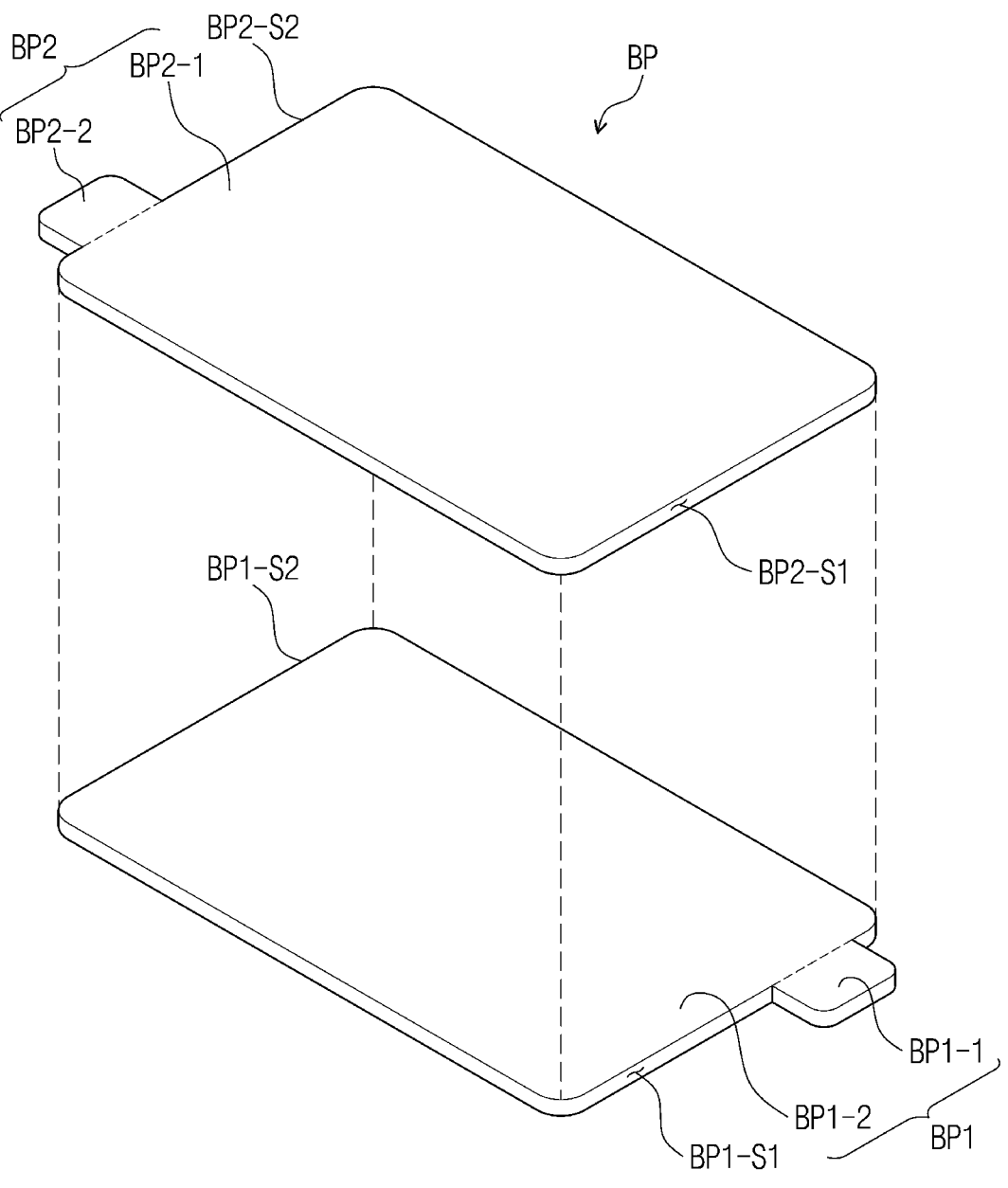
FIG. 12A and FIG. 12B are each a cross-sectional view of some components in a window assembly according to an embodiment of the invention.
Figure 12B:
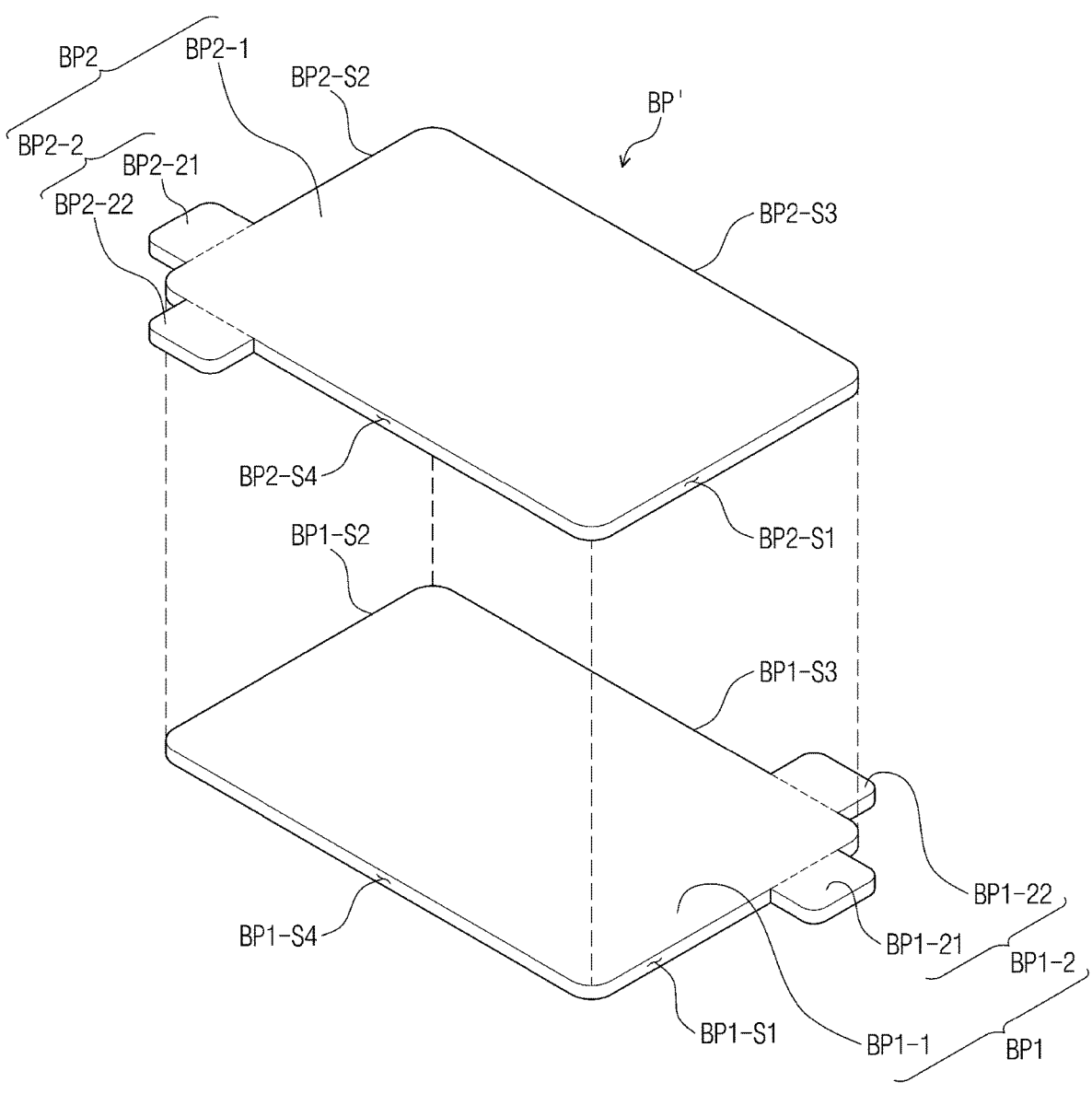

FIG. 12A and FIG. 12B are each a cross-sectional view of some components in a window assembly according to an embodiment of the invention. FIG. 12A and FIG. 12B respectively illustrate only the base parts BP and BP' included in the above-described window assembly.

Referring to FIG. 8A, FIG. 12A, and FIG. 12B together, the base parts BP and BP' included in the protective film assembly PF include the first base part BP1 and the second base part BP2, where the first base part BP1 and the second base part BP2 respectively include first portions BP1-1 and BP2-1 and second portion BP1-2 and BP2-2. The first base part BP1 may include a first portion (hereinafter, also referred to as "1-1 portion BP1-1") and a second portion (hereinafter, also referred to as 1-2 portion) BP1-2. The second base part BP2 may include a first portion (hereinafter, also referred to as "2-1 portion") BP2-1 and a second portion (hereinafter, also referred to as "2-2 portion") BP2-2.

The first portions BP1-1 and BP2-1 are portion overlapping the cover member CV on a plane in the window assembly WA. The first portions BP1-1 and BP2-1 may be portions overlapping the cover member CV on a plane in a state in which the protective film assembly PF is attached to the cover member CV. The first portions BP1-1 and BP2-1 may entirely overlap the cover member CV. The first portions BP1-1 and BP2-1 of the base parts BP1 and BP2 have shapes the same as or substantially similar to that of the cover member CV, and may be disposed to overlap the cover member CV to substantially cover the cover member CV.

The second portions BP1-2 and BP2-2 are portions protruding from the first portions BP1-1 and BP2-1. The second portions BP1-2 and BP2-2 are portions protruding outward from the first portions BP1-1 and BP2-1, and may be portion not overlapping the cover member CV on a plane. The second portions BP1-2 and BP2-2 may protrude outward to be used by a user as a handle for easily removing the protective film assembly PF when the protective film assembly PF is removed from the window assembly WA in the method for manufacturing a display device.

In each of the first base part BP1 and the second base part BP2 which are respectively included in the first protective film assembly PF1 and the second protective film assembly PF2, the first portions BP1-1 and BP2-1 may overlap each other, and the second portions BP1-2 and BP2-2 may not overlap each other. Each of the 1-1 portion BP1-1 and the 2-1 portion BP2-1 overlaps the cover member CV on a plane, so that the 1-1 portion BP1-1 and the 2-1 portion BP2-1 may overlap each other. Each of the 1-2 portion BP1-2 and the 2-2 portion BP2-2 protrudes from the first portions BP1-1 and BP2-1, and may be positioned not to overlap each other on a plane.

As respectively illustrated in FIG. 12A and FIG. 12B, each of the 1-1 portion BP1-1 and the 2-1 portion BP2-1 of the base parts BP and BP' has a plate shape parallel to the first direction DR1 and the second direction DR2, and may have four sides. The second portions BP1-2 and BP2-2 may have a shape protruding from different sides among the four sides of the first portions BP1-1 and BP2-1.

In an embodiment, as illustrated in FIG. 12A, the 1-1 portion BP1-1 and the 2-1 portion BP2-1 may respectively have first sides BP1-S1 and BP2-S1, second sides BP1-S2 and BP2-S2, third sides BP1-S3 and BP2-S3, and fourth sides BP1-S4 and BP2-S4, the 1-2 portion BP1-2 may have a shape protruding from the first side BP1-S1 of the 1-1 portion BP1-1, and the 2-2 portion BP2-2 may have a shape protruding from the second side BP2-S2 of the 2-1 portion BP2-1.

In an alternative embodiment, as illustrated in FIG. 12B, in each of the first base part BP1 and the second base part BP2, the second portions BP1-2 and BP2-2 may be provided in plurality. The 1-1 portion BP1-1 and the 2-1 portion BP2-1 may respectively have first sides BP1-S1 and BP2-S1, second sides BP1-S2 and BP2-S2, third sides BP1-S3 and BP2-S3, and fourth sides BP1-S4 and BP2-S4, and the 1-2 portion BP1-2 may include a first portion (hereinafter, also referred to as "1-21 portion") BP1-21 protruding from the first side BP1-S1 of the 1-1 portion BP1-1 and a second portion (hereinafter, also referred to as "1-22 portion") BP1-22 protruding from the third side BP1-S3 of the 1-1 portion BP1-1. The 2-2 portion BP2-2 may include a first portion (hereinafter, also referred to as "2-21 portion") BP2-21 protruding from the second side BP2-S2 of the 1-2 portion BP1-2 and a second portion (hereinafter, also referred to as "2-22 portion") BP2-22 protruding from the fourth side BP2-S4 of the 2-1 portion BP2-1.

In an alternative embodiment, the second portions BP1-2 and BP2-2 respectively included in the first base part BP1 and the second base part BP2 may protrude from same sides among the four sides of the first portions BP1-1 and BP2-1. The second portions BP1-2 and BP2-2 may be provided slightly shifted not to overlap on a plane while protruding from the same sides among the four sides of the first portions BP1-1 and BP2-1.

Figures 13A, 13B:
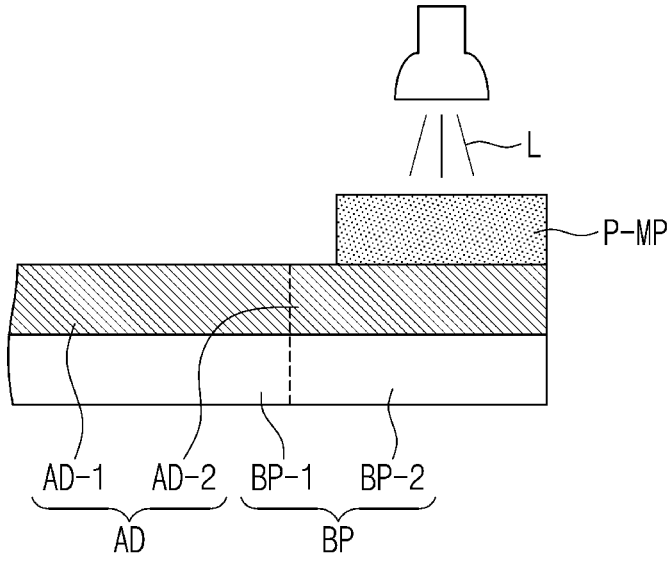
FIG. 13A to FIG. 13E are each a cross-sectional view of some processes of a method for manufacturing a display device according to an embodiment of the invention.
Figure 13C:
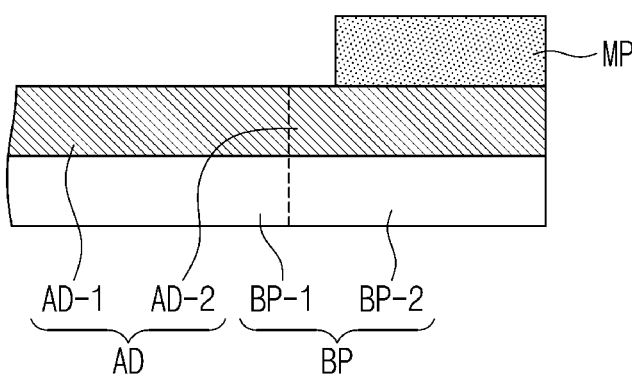
Figure 13D:
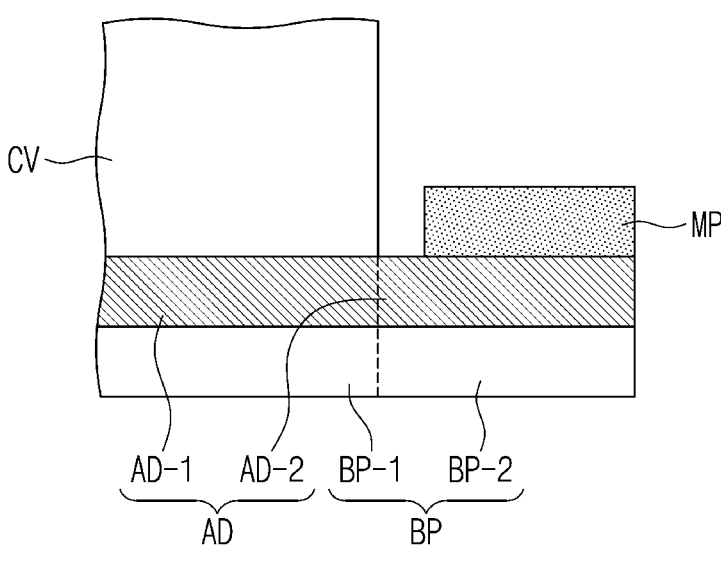
Figure 13E:
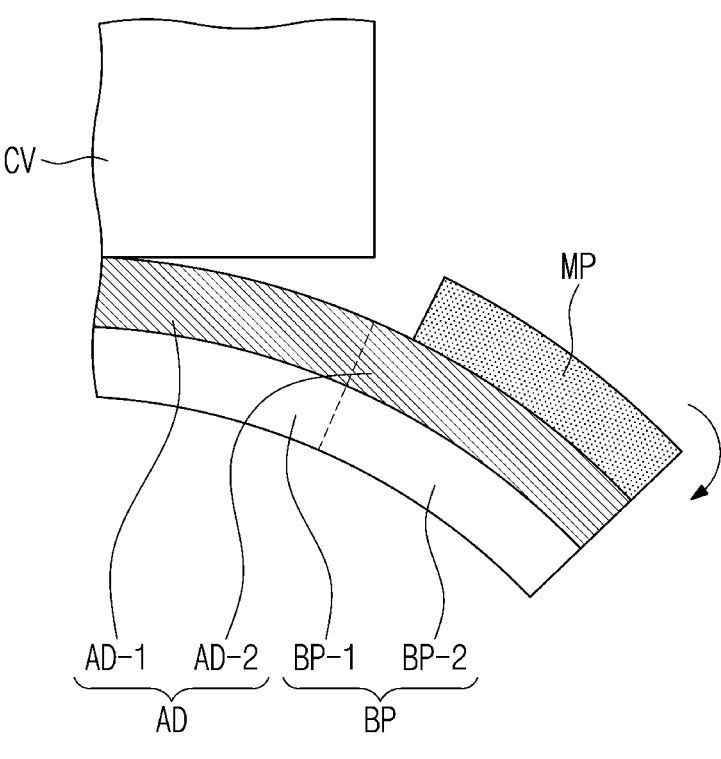

FIG. 13A to FIG. 13E are each a cross-sectional view of some processes of a method for manufacturing a display device according to an embodiment of the invention. FIG. 13A to FIG. 13E sequentially illustrate processes of preparing a cover member in a method for manufacturing a display device according to an embodiment of the invention. In processes of preparing a cover member, FIG. 13A to FIG. 13C illustrate forming a protective film assembly, FIG. 13D illustrates attaching the protective film assembly on one surface of the cover member, and FIG. 13E illustrates removing the protective film assembly attached on at least one surface of the cover member. Particularly, FIG. 13A to FIG. 13E illustrate the manufacturing processes in a cross-section corresponding to FIG. 11 described above. Particularly, FIG. 13A to FIG. 13E illustrate the manufacturing processes in the first protective film assembly PF1 of the above-described protective film assembly PF (see FIG. 8A), but the same description may be applied to each of the manufacturing processes in the second protective film assembly PF2 (see FIG. 8A).

Referring to FIG. 8A, FIG. 11, FIG. 13A, and FIG. 13B together, the forming of the protective film assembly PF includes preparing the base part BP including the first portion BP-1 and the second portion BP-2 protruding from the first portion BP-1, and then forming the adhesive layer AD on the base part BP. The adhesive layer AD may include a first adhesive portion AD-1 and a second adhesive portion AD-2, where the first adhesive portion AD-1 may be formed to overlap the first portion BP-1 of the base part BP, and the second adhesive portion AD-2 may be formed to overlap the second portion BP-2 of the base part BP. In an embodiment, the first portion BP-1 and the first adhesive portion AD-1 each correspond to an overlapping portion when the cover member CV is attached in a subsequent process. The first portion BP-1 and the second portion BP-2 have an indivisible and unitary shape of a single body, and in the same manner, the first adhesive portion AD-1 and the second adhesive portion AD-2 may also have an indivisible and unitary shape of a single body.

After the adhesive layer AD is formed on the base part BP, a preliminary masking member P-MP is formed to overlap the second portion BP-2 on the adhesive layer AD. The preliminary masking member P-MP may be formed by providing a curable ink composition INK to overlap the second portion BP-2. The curable ink composition INK may be provided through an inkjet nozzle NZ. The curable ink composition INK may be directly provided on the adhesive layer AD by a method such as screen printing, inkjet printing, gravure printing, offset printing, or the like. The preliminary masking member P-MP may be directly formed on the adhesive layer AD. The preliminary masking member P-MP may be directly formed on the first adhesive surfaces AD1-S1 and AD2-S1 (see FIG. 9) to which the cover member CV is to be attached in a subsequent process.

The curable ink composition INK may include an acrylic curable resin. In an embodiment, for example, the curable ink composition INK may include an acrylic photocurable compound. The curable ink composition INK may include an acrylic photocurable monomer, a (meth) acrylate-based photocurable polymer, or the like. Alternatively, the curable ink composition INK may include a moisture-curable acrylic monomer.

The curable ink composition INK may further include a curing initiator. In an embodiment, for example, the curable ink composition INK may further include, for example, a photoinitiator. However, the embodiment of the invention is not limited thereto, and alternatively, the curable ink composition INK may not include a separate curing initiator.

The curable ink composition INK may further include at least one selected from various additives in addition to the acrylic resin. In an embodiment, for example, the curable ink composition INK may further include at least one selected from a plasticizer, a lubricant, a leveling agent, a softener, an antioxidant, an anti-aging agent, a light stabilizer, an ultraviolet absorber, and a polymerization inhibitor.

Referring to FIG. 8A, FIG. 11, and FIG. 13A to FIG. 13C together, the forming of the protective film assembly PF includes forming the masking member MP by curing the preliminary masking member P-MP formed by providing the curable ink composition INK. The masking member MP may be formed by curing the preliminary masking member P-MP through photocuring or moisture-curing.

In an embodiment, the preliminary masking member P-MP may include an acrylic photocurable compound and a photoinitiator, and the preliminary masking member P-MP may be cured by ultraviolet rays L. However, the embodiment of the invention is not limited thereto, and separate light, such as ultraviolet rays, is not provided to the preliminary masking member P-MP, and the preliminary masking member P-MP may be moisture-cured. As the preliminary masking member P-MP is exposed to air for a predetermined time, crosslinks may be formed between moisture-curable acrylic monomers included in the preliminary masking member P-MP by moisture contained in the air, so that moisture-curing may be achieved.

The forming of the masking member MP by curing the preliminary masking member P-MP may be performed at a temperature of about 60° C. or less. The forming of the masking member MP by curing the preliminary masking member P-MP may be performed through a photocuring or moisture-curing process as described above, and a process of curing by applying heat may not be included. The forming of the masking member MP by curing the preliminary masking member P-MP is performed at a relatively low temperature of about 60° C. or less, so that it is possible to prevent a defect in which the adhesive layer AD and the base part BP are damaged due to a high temperature in the curing process.

In the method for manufacturing a display device according to an embodiment, in the preparing of the cover member CV, the masking member MP is formed by providing a curable ink composition and then curing the curable ink composition, so that a gap between the masking member MP and the cover member CV is reduced to prevent an exposed surface of the adhesive layers AD from being contaminated by foreign substances. In addition, in the case of a typical masking member provided in a typical protective film assembly, a process of laminating a polyethylene terephthalate film or the like and a process of punching (or cutting) a portion of the film may be omitted, but in the forming of the masking member MP according to an embodiment, since the curable ink composition INK is patterned at a desired position through an inkjet process, a punching (or cutting) process may be omitted, so that the number of processes for forming the masking member MP may be reduced and process costs may be lowered.

Referring to FIG. 8A, FIG. 11, FIG. 13C, and FIG. 13D, after the protective film assembly PF is formed by forming the masking member MP, the protective film assembly PF is attached to the cover member CV. The cover member CV may be attached to overlap the first portion BP-1 of the base part BP. The cover member CV may be attached to overlap the first adhesive portion AD-1 of the adhesive layer AD. The cover member CV may be attached to an upper surface of the first adhesive portion AD-1 of the adhesive layer AD. In an embodiment, the cover member CV may be attached to the same surface as the surface of the adhesive layer AD on which the masking member MP is formed. That is, the masking member MP and the cover member CV may be disposed on both of the first adhesive surfaces AD1-S1 and AD2-S1 (see FIG. 9) of the adhesive layer AD. The cover member CV may be directly disposed on the first adhesive portion AD-1 of the adhesive layer AD.

Referring to FIG. 8A, FIG. 11, FIG. 13D, and FIG. 13E, the preparing of the cover member CV according to an embodiment may include attaching the protective film assembly PF to the cover member CV and then removing the attached protective film assembly PF. The cover member CV goes through transferring and processing with the protective film assembly PF attached to at least one surface thereof, and thus, the at least one surface of the cover member CV may be protected from contamination and damage by the protective film assembly PF. In an embodiment, the second portion BP-2 of the base part BP may function as a handle portion when removing the protective film assembly PF from one surface of the cover member CV, and the masking member MP may prevent the adhesive layer AD from adhering to a user's hand when the user grips the second portion BP-2, which is the handle portion. In addition, the masking member MP covers the second adhesive portion AD-2 of the adhesive layer AD, which is exposed while the cover member CV coupled with the protective film assembly PF goes through the transferring and processing, and thus, may prevent the second adhesive portion AD-2 from being contaminated by process foreign substances or the like.

According to an embodiment of the invention, the area of an adhesive surface exposed in the middle of processing is minimized to prevent contamination, and a masking member covering the exposed adhesive surface may be formed by a simplified process. Accordingly, the process reliability of a window assembly and a method for manufacturing a display device, which is manufactured therethrough may be improved, and the number of processes and costs of the processes may be reduced.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A window assembly comprising:
a cover member including a front surface and a rear surface opposite to the front surface; and
a protective film assembly disposed on at least one selected from the front surface and the rear surface of the cover member,
wherein the protective film assembly includes:
a base part including a first portion overlapping the cover member, and a second portion protruding from the first portion, wherein the second portion does not overlap the cover member on a plane;
an adhesive layer disposed on the base part and between the cover member and the base part; and
a masking member disposed on the adhesive layer to overlap at least a portion of the second portion, wherein the masking member comprises a material derived from a curable ink composition.

2. The window assembly of claim 1, wherein the curable ink composition comprises an acrylic resin.

3. The window assembly of claim 2, wherein the curable ink composition further comprises a photoinitiator.

4. The window assembly of claim 1, wherein the masking member has a thickness in a range of about 3 micrometers to about 20 micrometers.

5. The window assembly of claim 1, wherein the masking member is spaced apart from the cover member by a first gap, wherein the first gap is about 0.2 millimeter or less.

6. The window assembly of claim 1, wherein the adhesive layer comprises:
a first adhesive surface adjacent to the cover member; and
a second adhesive surface adjacent to the base part,
wherein the masking member is disposed on the first adhesive surface.

7. The window assembly of claim 1, wherein the adhesive layer is in contact with each of the base part and the cover member.

8. The window assembly of claim 1, wherein the adhesive layer is defined by a single layer between the masking member and the base part.

9. The window assembly of claim 1, wherein the adhesive layer comprises a first adhesive portion overlapping the first portion of the base part, and a second adhesive portion overlapping the second portion of the base part,
wherein the masking member is disposed on the second adhesive portion.

10. The window assembly of claim 9, wherein one side surface of the second portion, one side surface of the second adhesive portion, and one side surface of the masking member define a single aligned side surface of the window assembly.

11. The window assembly of claim 1, wherein the protective film assembly includes:
a first protective film assembly disposed on the rear surface of the cover member; and
a second protective film assembly disposed on the front surface of the cover member.

12. The window assembly of claim 11, wherein:
the first protective film assembly comprises a first masking member; and
the second protective film assembly comprises a second masking member,
wherein the first masking member and the second masking member do not overlap each other on a plane.

13. A window assembly comprising:
a cover member including a front surface and a rear surface opposite to the front surface; and
a protective film assembly disposed on at least one selected from the front surface and the rear surface of the cover member,
wherein the protective film assembly includes:
a base part including a first portion overlapping the cover member, and a second portion protruding from the first portion, wherein the second portion does not overlap the cover member on a plane;
an adhesive layer disposed on the base part, wherein at least a portion of the adhesive layer is disposed between the cover member and the base part; and
a masking member disposed on the adhesive layer to overlap at least a portion of the second portion, wherein the masking member comprises a cured acrylic resin.

14. A method for manufacturing a display device, the method comprising:
preparing a cover member;
preparing a display module; and
coupling the cover member to the display module,
wherein the preparing the cover member includes:
forming a protective film assembly; and
adhering the protective film assembly on at least one surface of the cover member,
wherein the forming the protective film assembly includes:
preparing a base part including a first portion overlapping the cover member, and a second portion protruding from the first portion;
forming an adhesive layer on the base part;
forming a preliminary masking member on the adhesive layer by providing a curable ink composition to overlap the second portion; and
forming a masking member by curing the preliminary masking member.

15. The method of claim 14, wherein the preparing the cover member further includes removing the protective film assembly adhered to the at least one surface of the cover member.

16. The method of claim 14, wherein the curable ink composition comprises an acrylic resin.

17. The method of claim 16, wherein
the curable ink composition further comprises a photoinitiator, and
in the curing the preliminary masking member, the preliminary masking member is irradiated with ultraviolet rays.

18. The method of claim 16, wherein in the curing of the preliminary masking member, the preliminary masking member is moisture-cured.

19. The method of claim 14, wherein the curing the preliminary masking member is performed at about 60° C. or less.

* * * * *